(12) United States Patent
Torsi et al.

(10) Patent No.: US 11,726,056 B2
(45) Date of Patent: Aug. 15, 2023

(54) FIELD-EFFECT TRANSISTOR SENSOR

(71) Applicant: UNIVERSITA' DEGLI STUDI DI BARI ALDO MORO, Bari (IT)

(72) Inventors: Luisa Torsi, Bari (IT); Gerardo Palazzo, Bari (IT); Gaetano Scamarcio, Bari (IT)

(73) Assignee: UNIVERSITA' DEGLI STUDI DI BARI ALDO MORO, Bari (IT)

( * ) Notice: Subject to any disclaimer, the term of this patent is extended or adjusted under 35 U.S.C. 154(b) by 597 days.

(21) Appl. No.: 16/624,034

(22) PCT Filed: May 22, 2018

(86) PCT No.: PCT/IB2018/053611
§ 371 (c)(1),
(2) Date: Dec. 18, 2019

(87) PCT Pub. No.: WO2018/234905
PCT Pub. Date: Dec. 27, 2018

(65) Prior Publication Data
US 2021/0148854 A1    May 20, 2021

(30) Foreign Application Priority Data

Jun. 22, 2017  (EP) .................................... 17177349

(51) Int. Cl.
*H01L 29/41* (2006.01)
*G01N 27/414* (2006.01)

(52) U.S. Cl.
CPC ............................... *G01N 27/4145* (2013.01)

(58) Field of Classification Search
CPC ......... H01L 29/66477; H01L 29/78648; H01L 29/66484; H01L 29/7831; H01L 51/0093; G01N 27/4145; G01N 27/4148; G01N 27/414; G01N 33/54373; G01N 33/48707; G01N 33/5438; G01N 27/403; G01N 27/333; G01N 33/543
See application file for complete search history.

(56) References Cited

U.S. PATENT DOCUMENTS

| | | | |
|---|---|---|---|
| 2010/0065892 A1 | 3/2010 | Hwang et al. | |
| 2010/0264024 A1* | 10/2010 | Fukushima | B82Y 30/00 204/403.01 |
| 2017/0234830 A1* | 8/2017 | White | C12Q 1/6869 205/775 |

FOREIGN PATENT DOCUMENTS

| | | | |
|---|---|---|---|
| JP | 2004271188 A | * | 9/2004 |
| WO | 2013055234 A1 | | 4/2013 |

OTHER PUBLICATIONS

International Search Report and Written Opinion of the International Searching Authority for International Application No. PCT/IB2018/053611 dated Oct. 9, 2018.
(Continued)

*Primary Examiner* — Samuel Park
(74) *Attorney, Agent, or Firm* — Heslin Rothenberg Farley & Mesiti P.C.; Victor A. Cardona, Esq.

(57) ABSTRACT

Described herein is a field effect transistor sensor including: a substrate, a source electrode, a drain electrode, a gate electrode functionalized with a layer of biological recognition elements, a source-drain channel and a semiconductor layer. The layer of biological recognition elements of the gate electrode is patterned into a plurality of uncoupled domains.

11 Claims, 9 Drawing Sheets

(56) References Cited

OTHER PUBLICATIONS

Bhatt, V.D., et al., "Flexible, Low-Cost Sensor Based on Electrolyte Gates Carbon Nanotube Field Effect Transistor or Organo-Phosphate Detection", Sensors, vol. 17, No. 6, p. 1147 (2017).

Melzer, K., et al., "Multi ion-sensor arrays: Towards an electronic tongue", 2016 IEEE 16th International Conference on Nanotechnology, IEEE, pp. 475-478 (2016).

Mulla, M.Y., et al., "Capacitance-modulated transistor detects odorant binding protein chiral interactions", Nature Communications, vol. 6, p. 6010 (2015).

Yaman, B., et al., "Fabrication of a planar water gated organic field effect transistor using a hydrophilic polythiophene for improved digital inverter performance", Organic Electronics, vol. 15, No. 6, pp. 646-653 (2014).

\* cited by examiner

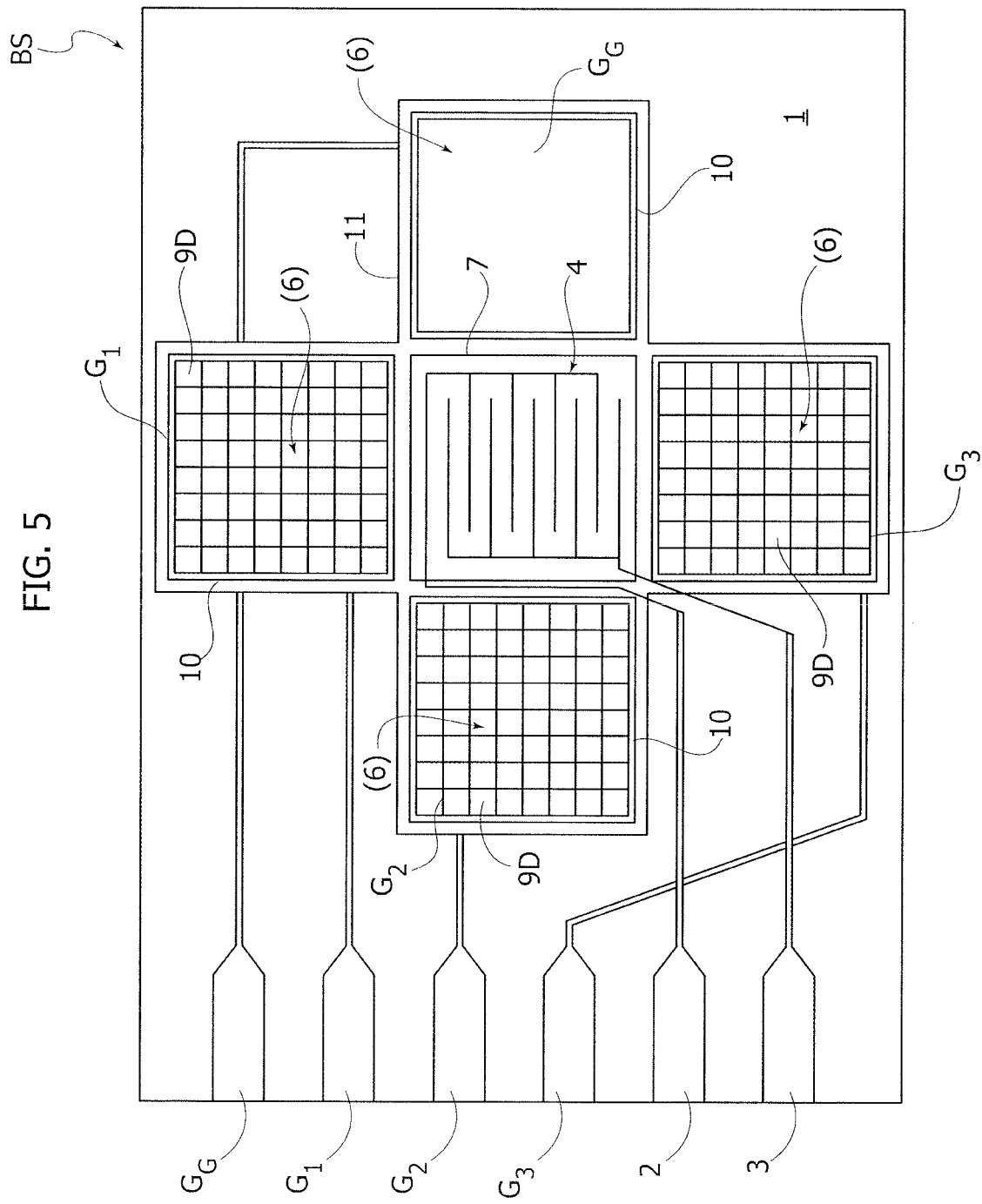

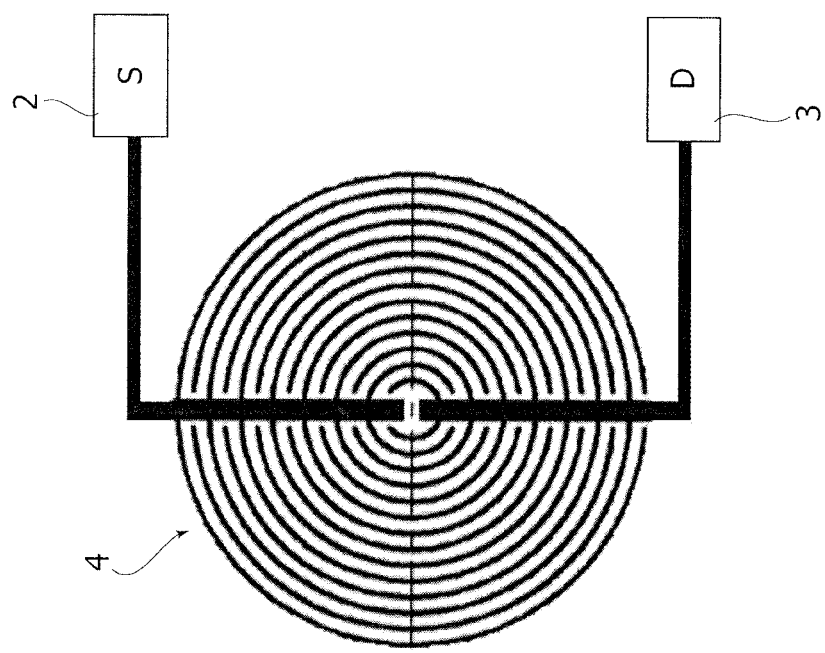
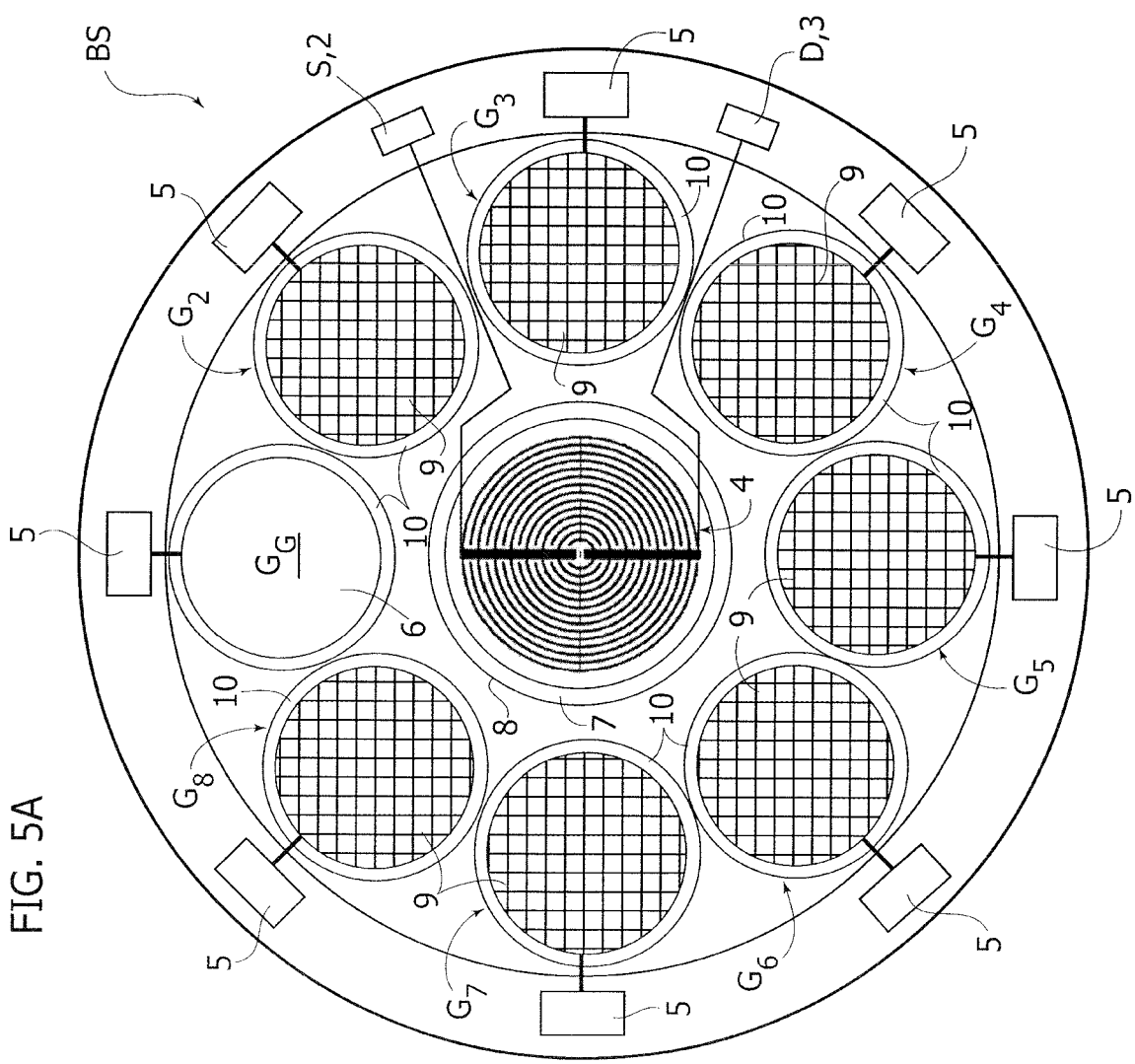

FIELD-EFFECT TRANSISTOR SENSOR

CROSS REFERENCE TO RELATED APPLICATIONS

This application is a national stage filing under section 371 of International Application PCT/IB2018/053611, filed on May 22, 2018, published in English on Dec. 27, 2018 as WO2018/234905A1, and claims priority to European Patent Application No. 17177349.2, filed on Jun. 22, 2017. The entire disclosures of each application are hereby incorporated herein by reference.

FIELD OF THE INVENTION

The present invention relates to field-effect transistor sensors, in particular biosensors.

PRIOR ART

In the field of biosensors, and particularly of field-effect transistor biosensors, the search for a sensing system capable of detecting biomarkers at the earliest possible stage of a disease is gaining momentum as new technologies allow for more and more sensitive and reliable detections.

So far, however, the methodological approach has been driven by the idea that miniaturizing, to the highest possible limit, the sensing surface of a detector would be the way to proceed. Label-free single-molecule detection has been achieved via nano-systems that can incorporate or host, owing to size constraints, very few biological receptors.

Single DNA detection has been performed by means of a biosensor based on a single carbon-nanotube field-effect transistor. In this transistor, the DNA probe is attached to a point defect of the nano-channel whose conductance is affected by the presence of a complementary DNA target.

Label-free single-molecule detection has been also performed by way of a whispering gallery mode microcavity. The sensing occurs through the plasmon-enhanced field generated in gold nanorods, that notably depends on the nano-objects aspect ratio, orientation and surface roughness.

Platforms based on force spectroscopies (optical and magnetic tweezers, atomic force microscopy) or ion channels and nanopores, rely also on nano-tools to achieve nanoscale spatial localization. These systems inherently funnel a large (a very large, actually) number of biomarkers towards the interaction with very few biological recognition elements. This leads to a sequence of a highly probable single binding detection events. The single event is measurable as it changes a relative large portion of the nano-surface involved in the interaction.

To actually sense a single biomarker that is dispersed in a large volume of a biological fluid (i.e. a biomarker having an extremely low concentration), the binding events become so highly improbable that a nano-sensor would have to wait for an impractically long time to actually detect a few biomarkers. Accordingly, all of the above detection techniques are inherently unable to track few ligands in a biologically relevant medium as required for instance in early biomarkers detection, wherein the ligand concentration is extremely low. Such nano-systems are also still limited by low reproducibility of the detection events (and the associated results) and production scalability, both being major issues in the transfer of a technological platform into real clinical applications.

Strikingly, biological cells can decode semiochemicals with a single-molecule sensitivity, through the huge number of receptors residing on the surface thereof. Exemplary of this are sperm cells that, in order to locate the egg cell (ovum), are capable of sensing environmental cues relative to the egg cell down to the physical detection limit.

The binding event between a chemoattractant and one receptor initiates the cell orientation towards the increasing semiochemicals gradient pointing to the source. The more sensitive the cell is, the faster the navigation thereof will be oriented towards the target. Sperm cell can detect as low as 3-4 ligands while a single ion channel linked receptor (e.g. nicotinic acetylcholine receptors) is able to convert a chemical signal into a detectable ionic current.

Notably, for the chemoattractant-receptor interaction cross-section to be sufficiently high, the cell surface must be covered by an extraordinary large number of highly packed receptors.

Bioelectronics represents one of the most promising directions in printable or low cost production electronics and field-effect transistor (FET). Such devices, that can span dimensions from μm to mm in size, are based on materials such as printable organic semiconductors (OSCs) but also metal oxides like Indium Gallium Zinc Oxide (IGZO), carbon nanotube thin-films as well as 2D materials such as graphene. Among the others, organic FET, particularly electrolyte gated ones, have been demonstrated to work as highly performing bioelectronic FET (bio-FET) sensors.

While high sensitivity is assured by the FET transduction mechanism, selectivity is achieved by integrating a layer of functional biological recognition elements, directly coupled with an electronic interface. The study of such biological interfaces has provided insights into the conformational changes of the receptor bio-systems, proving also to be a label-free, sensitive and selective biosensing technology. Electrolyte gated sensors exhibit detection limits down to picomolar ($10^{-12}$ M) and the high repeatability of the sensor responses is characterized by relative standard deviation as low as 3-5% for hundreds of repeated determinations. Up to $10^4$ repeated measurements in sea water were successfully performed with extremely high repeatability. Moreover, sub-femtomolar ($10^{-15}$ M, fM) detections were achieved with a graphene FET modified with human olfactory receptors 2AG1. It is important to clarify that, taking into account the volumes typically used with bio-FETs (100 μL), the number of detected ligands has been so far $10^8$ at pM concentration or $10^5$ at fM concentration, therefore the state-of-the-art in electronic label-free sensing is still very far from single-molecule detection.

Another major drawback of prior art biosensors constituted of a bio-interface that is populated by a large number of biological recognition elements, lies in the de-activation thereof following a single or very few ligand recognition events. In a prior art functionalized gate electrode, whenever a ligand recognition event occurs, the conformational changes following the same—which are representative of an amplification process of the electrical signal originated by the packed receptors on the functionalized gate electrode—very rapidly spread to the remaining of the biological recognition layer. This results in the biosensor rapidly becoming—so to say—"blind" to further ligand recognition events—possibly occurring at different ligand concentrations—as all of the remaining receptors on the gate electrode are deactivated. Such biosensors can in fact act as a sort of binary devices responding, abruptly reaching saturation, to the presence of few ligands.

While such a phenomenon can allow to detect few proteins with a millimetre size device, it may prevent the biosensor from having a wide concentration dynamic range, as the biosensor would be intrinsically incapable of sensing both single/few ligands recognition events and also ligand concentrations over at least three orders of magnitude larger.

OBJECT OF THE INVENTION

The object of the present invention is to overcome the above mentioned technical drawbacks. Specifically, the present invention is aimed at providing a FET biosensor capable of detecting biomarkers (ligands) at extremely low concentrations (which can enable early detection of biomarkers in clinical screening), yet exhibiting a sufficiently wide concentration dynamic range to spam few orders of magnitude of dynamic range.

The invention also deals with a novel biosensor structure that enables the semiconductor, even when not fully stable in a water environment, to be in electrical/ionic contact with a water electrolyte or even a bio-fluid while physically protected by a hydrophobic ionic conducting material that covers and possibly seals the semiconductor layer itself. Such a layer being ionically conductive, while physically covering and protecting the semiconductor from water, does not impairs the capacitive coupling between the gating medium and the FET channel, thus allowing the field effect channel to be installed into the semiconducting layer by the high capacitance charge double layer induced at the interface with the ionic medium.

SUMMARY OF THE INVENTION

The object of the present invention is achieved by a field-effect transistor sensor having the features forming the subject of the claims that follow, which form an integral part of the technical disclosure herein provided in relation to the invention.

BRIEF DESCRIPTION OF THE FIGURES

Further features and advantages of the invention will become apparent from the following description with reference to the annexed figures, provided purely by way of non-limiting example, and wherein:

FIG. 5 is a schematic plan view showing a FET biosensor according to a further embodiment of the invention, FIGS. 5A and 5B are representative of yet a further embodiment of the FET biosensor according to the invention, with FIG. 5B showing a magnified detail of FIG. 5A.

DETAILED DESCRIPTION OF PREFERRED EMBODIMENTS

Figure 1:
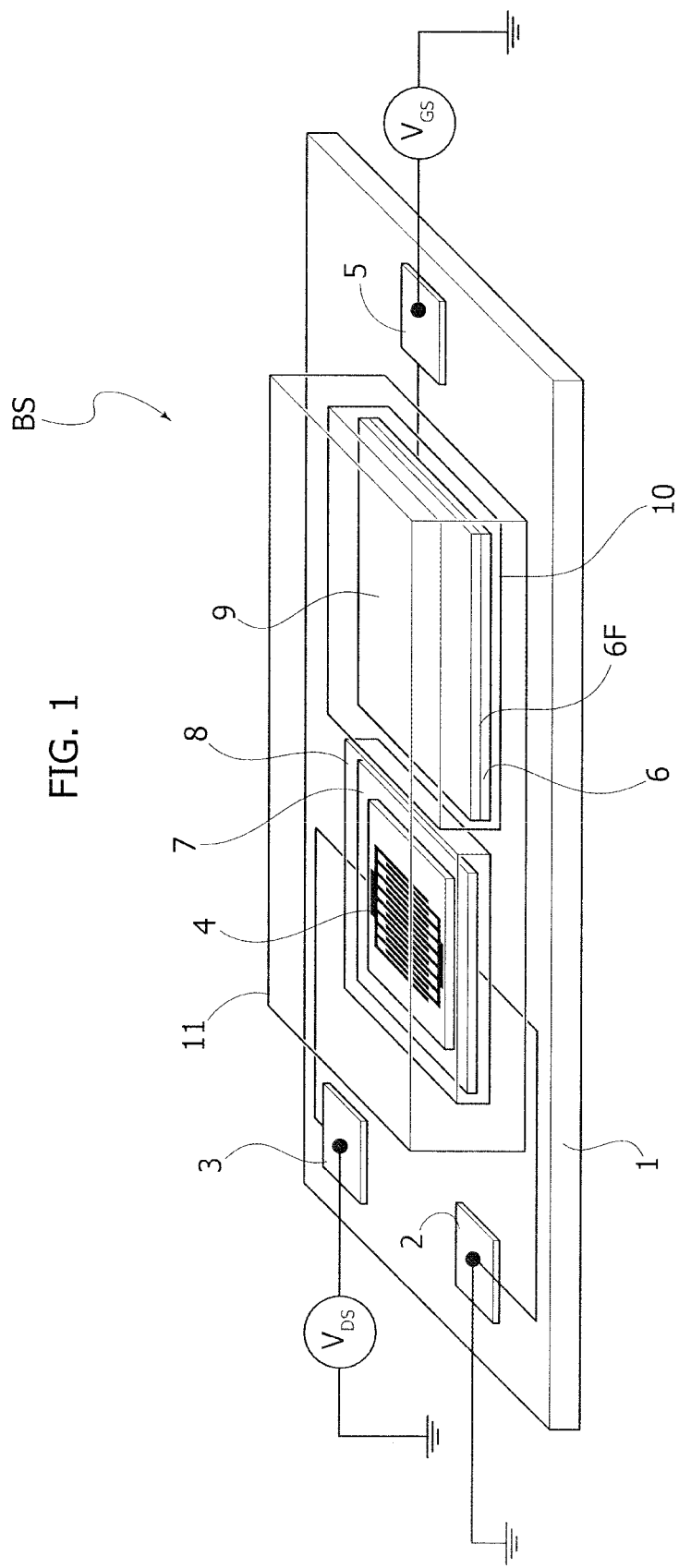
FIG. 1 is a schematic three-dimensional view showing a FET biosensor according to the invention.

With reference to FIG. 1, the reference BS designates as a whole a FET biosensor featuring a gate electrode functionalized according to the method of the invention.

The biosensor BS includes a substrate 1, preferably made of $Si/SiO_2$. The substrate 1 is flat and non-conductive. Alternatively a glass slide or a flexible plastic substrate such as poliimmide (Kapton®), mica (phyllosilicate, exhibiting a two-dimensional sheet or layer structure), poly(ethylene 2,6-naphthalate) or polyethylene terephthalate can be used.

On the substrate 1, the source (S) and drain (D) electrodes are provided as gold pads made by (photo)lithography and designated, respectively, by reference numbers 2 and 3. In the lithographic process, source (S) and drain (D) pads (and the interdigitated electrodes) are defined by electron-beam evaporated gold (50 nm thickness) and a prior deposited layer of titanium (50 nm thickness) serving as adhesion layer. Alternatively, these pads can be defined by screen printing of a conducting ink or thought thermal or e-beam evaporation of titanium first and gold afterwards trough a shadow mask. Throughout the description, the source and drain electrodes may be referred to as "source pad" and "drain pad" respectively, whether or not in association to the respective reference numbers 2 and 3.

Figure 2:
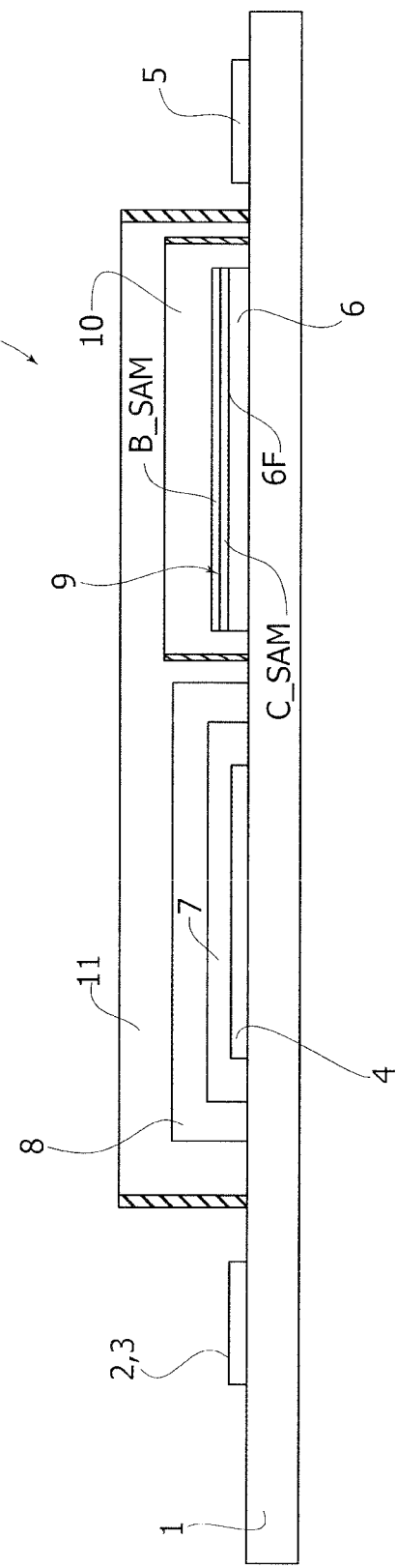
FIG. 2 is a bi-dimensional view showing the FET biosensor of FIG. 1.
Figure 2A:
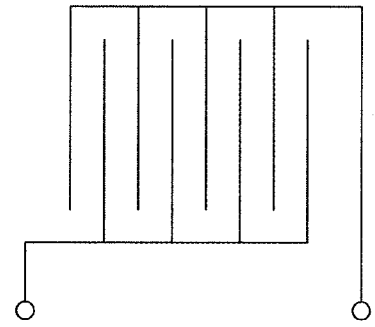
FIG. 2A is a schematic representation of a sub-unit of the biosensor of FIG. 1.
Figure 2B:
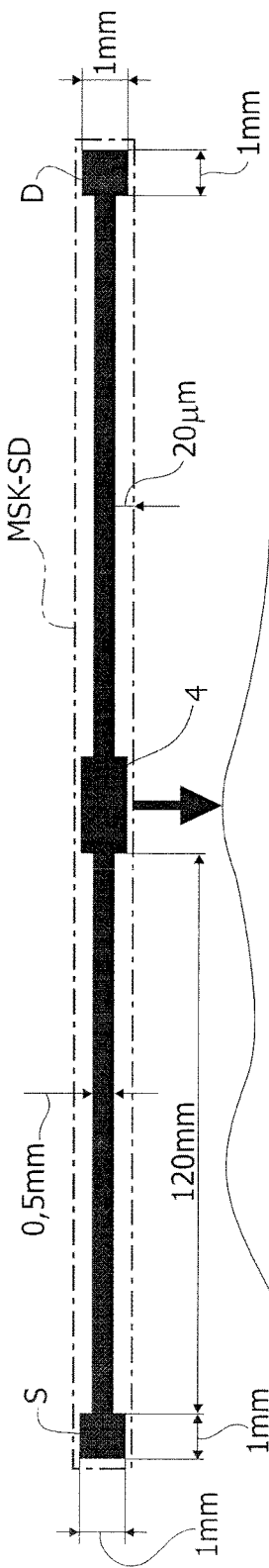
FIG. 2B shows an exemplary pattern of source and drain electrodes in a FET biosensor according to the invention.
Figure 2C:
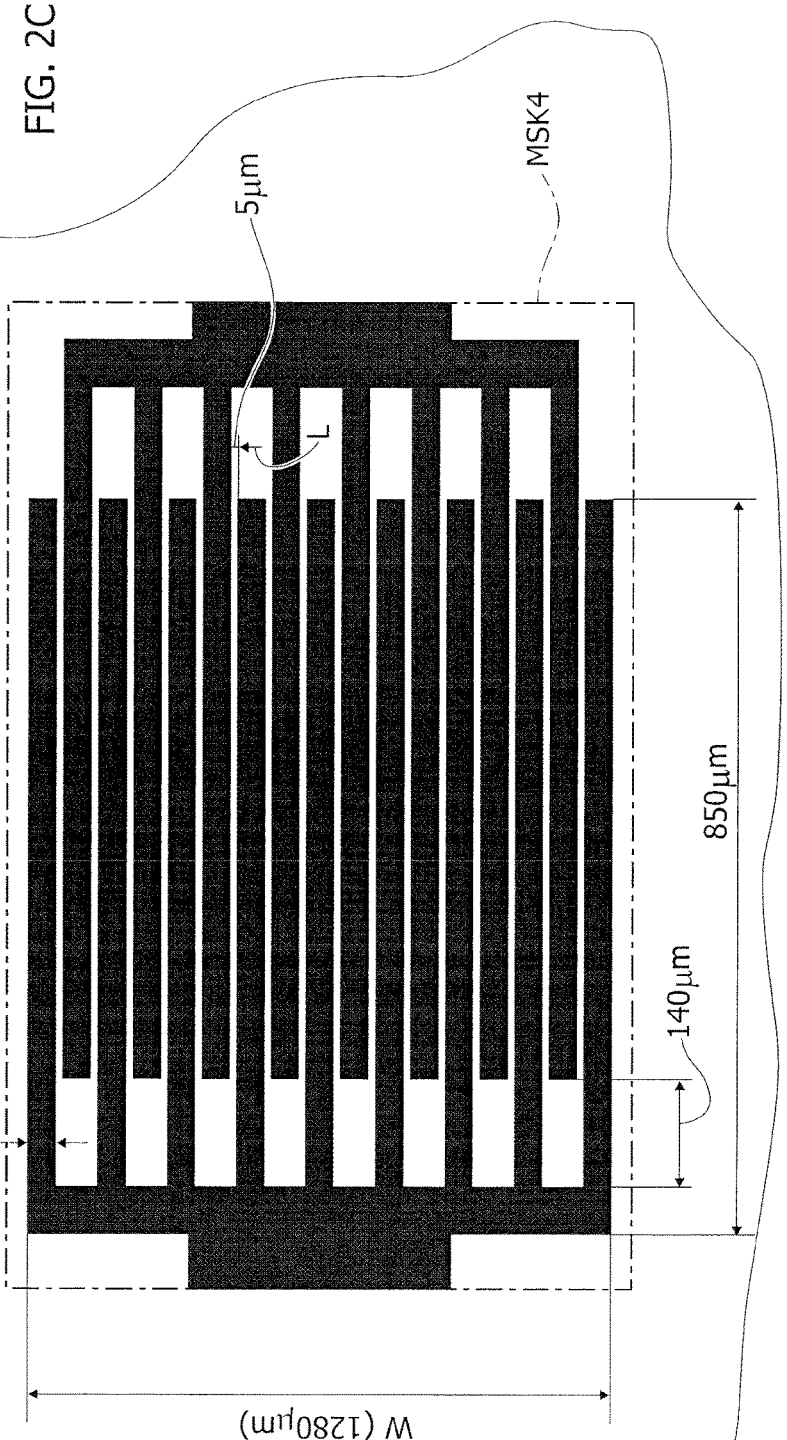
FIG. 2C is a magnified view of the channel area of FIG. 2B, corresponding to the sub-unit of FIG. 2A.
Figure 2D:
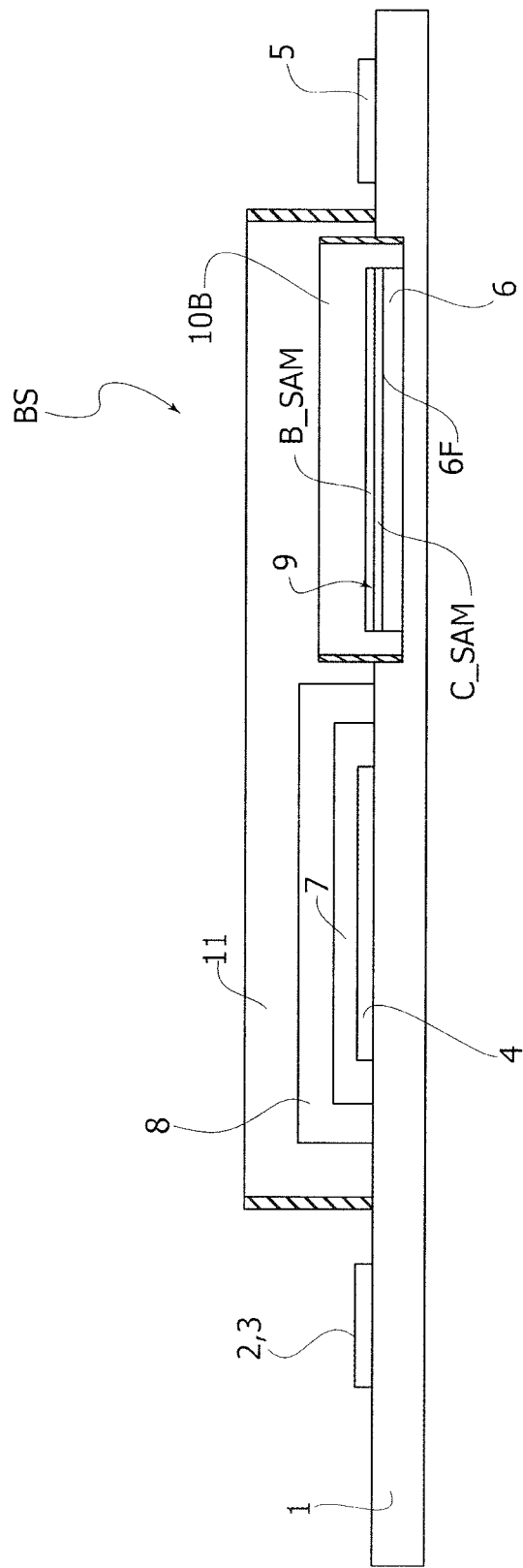
FIG. 2D shows a variant embodiment of the FET biosensor of FIG. 2
Figure 3A:
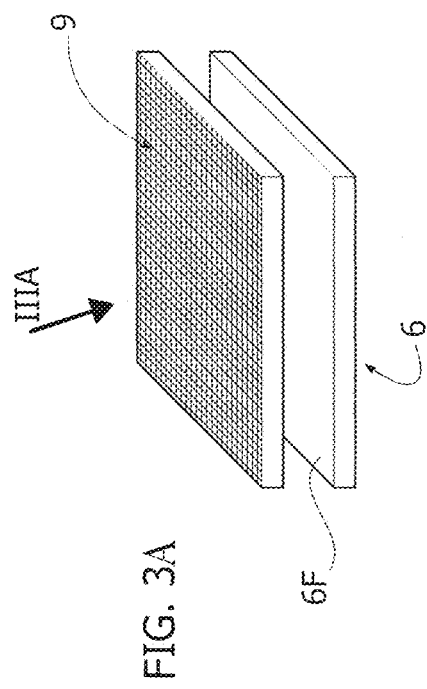
FIG. 3A is a schematic, partly exploded, view of a gate electrode of the biosensor according to the invention, with FIG. 3B providing a magnified view of a detail thereof indicated by pointer IIIA in FIG. 3, FIGS. 4A to 4C show different stages of the functionalization of the gate electrode of the biosensor according to the invention.

The source and drain pads are connected to an interdigitated pattern of gold electrodes 4 that defines the FET channel, a schematic representation of which is provided in FIG. 2A. FIG. 2B provides a more detailed representation of the interdigitated pattern together with some dimensional values of the preferred embodiment, while FIG. 2C offers a magnified view of a portion of FIG. 2B. FIG. 2D offers a cross-sectional view of another embodiment of the biosensor BS that includes the well 10, into which the gate electrode is fabricated, drilled in the rigid substrate. In the description that follows, such interdigitated pattern will be oftentimes referred to as "interdigitated S and D pattern".

In a preferred embodiment, the interdigitated pattern (FET channel) is 1280 µm wide (W, equipotential electrode region) and 5 µm long (L, distance separating two differently biased regions). Preferably, the interdigitated pattern is defined photolithographically as well, similarly to the gold pads 2, 3. The area separating two differently biased regions L may be as large as 5-200 µm, and can be used with the width W scaled proportionally, or with less fingers and channels if the size of the overall pattern becomes larger than the gate area. L spacing larger than 100 µm, can also be considered to enable the printing or the definition through screen mask of the interdigitated pattern.

The FET biosensor BS includes a gate electrode comprising a gate contact pad 5, and a gate electrode plate 6 electrically coupled thereto. The gate is located alongside from the interdigitated S and D pads leaving from 0.1 µm to 10 cm in between. The gate electrode 6 can be either a gold platelet (self-standing three-dimensional piece of gold being from 0.1 to 3 mm thick) or can be defined as thin-film (by e-beam or thermal evaporation as well as by printing) of Ti (50 nm) and Au (50 nm) on whatever other substrate such as for instance mica or glass that. When the gate is fully structured with pixels and bio-functionalized with all that is needed to function, is attached to the BS substrate. Alternatively, the gate electrode 6 can be defined as a thin-film or by printing directly on the BS substrate. The latter can be a flexible substrate such as poliimmide, mica, poly(ethylene 2,6-naphthalate) or polyethylene terephthalate, but also on rigid substrates such as Si/SiO$_2$, glass or plastic.

In FIG. 2 the embodiment of the biosensor BS with the gate being coplanar to the interdigitated S and D structure is depicted, while in FIG. 2D the gate structure is allocated into a well excavated in the BS substrate or realized by 3D printing. The gate layer 6 is again attached or realized directly on the bottom of wells into a rigid substrate as reported in FIG. 2, FIG. 2D and FIG. 5.

The actual gating function is on the gate electrode 6, while the pad 5 essentially serves as an electrical interface to outside equipments so that oftentimes in the following description, whenever reference is to be made or technical disclosure is to be provided in respect of the gate electrode, the same will be made by addressing the gate electrode plate 6 as—actually—the "gate electrode".

The gate electrode 6 (either attached or deposited on a flat substrate—FIG. 2A—or placed in a well excavated in the substrate—FIG. 2D) is a gold electrode with a surface area ranging from 0.001 to 1 cm$^2$ and in any case from one (1) to ten (10) times the area of the whole interdigitated S and D pattern 4. Also the gate can be defined as thin-film by thermal or electron-beam evaporation of gold on a titanium adhesion layer (vide infra). The gold gate area can be defined on the SiO$_2$ substrate as well as on Kapton and other rigid or flexible plastic substrates. As already mentioned alternatively, the gold gate can be defined into a well realized in the substrate.

Figure 4:
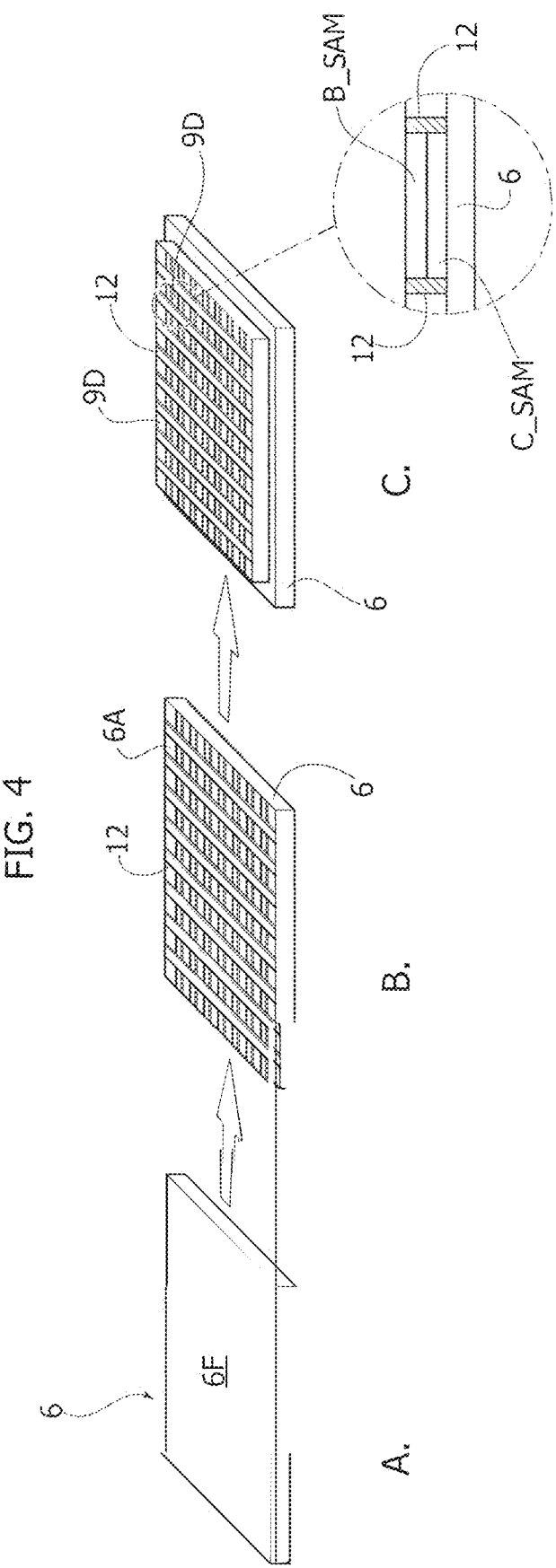

The gate electrode 6, both as platelet or as deposited thin-film, includes a surface 6F opposite to the substrate 1 which is functionalized with a layer 9 of biological recognition elements. With reference to FIG. 4C, the layer of biological recognition elements 9 is patterned into a plurality of uncoupled domains 9D.

With reference to FIGS. 3A and 4A to 4C, the layer of biological recognition elements 9 is patterned in the plurality of domains 9D so that the whole surface is divided in smaller areas that can be as many as required. Essentially, the layer of biological recognition elements 9 is formed—so to say—"pixelwise", wherein each domain 9D constitutes a single "pixel", which is uncoupled from the other "pixels". Each pixel can be either physically separated from the others, meaning that no material physically connects adjacent pixels, or they can be connected through a material that decouples adjacent pixels both electrostatically and mechanically. The latter alternative (connected through a material that decouples adjacent pixels both electrostatically and mechanically) is representative of preferred embodiments of the invention.

The layer of biological recognition elements 9 is preferably provided as a self-assembled monolayer (SAM) of biological recognition elements (attached to a chemical-SAM) that are patterned in the domains 9D separated by net boundaries.

Preferably, the plurality of domains is arranged according to a matrix. Even more preferably, each of the domains of said plurality is quadrangular—preferably square—in shape, so that each domain 9D makes up a matrix cell. In other embodiments, however, the domains 9D may be circular or triangular in shape, or else hexagonal, so as to be arranged into a honeycomb pattern.

Whatever the shape of the domains 9D, each one has a surface extension ranging from $10^{-7}$-$10^{-4}$ cm$^2$ to $10^{-5}$-$10^{-1}$ cm$^2$. Particularly, the surface extension may range from $10^{-7}$-$10^{-4}$ cm$^2$ to $10^{-5}$-$10^{-1}$ cm$^2$, particularly from $10^{-7}$ cm$^2$ to $10^{-1}$ cm$^2$, or particularly from $10^{-5}$ cm$^2$ to $10^{-4}$ cm$^2$, or particularly from $10^{-7}$ cm$^2$ to $10^{-5}$ cm$^2$, or particularly from $10^{-5}$ cm$^2$ to $10^{-4}$ cm$^2$, or particularly from $10^{-4}$ cm$^2$ to $10^{-1}$ cm$^2$, or particularly from $10^{-7}$ cm$^2$ to $10^{-4}$ cm$^2$, or yet particularly from $10^{-5}$ cm$^2$ to $10^{-1}$ cm$^2$. This applies both to the embodiments according to FIGS. 3A and 4A to 4C, and to the embodiments of FIGS. 5, 5A, 5B.

The bio-functionalization process is performed with one of methods that will be described in the following paragraphs. The bio-functionalization applies to all of the domains 9D, as the SAM layer is confined within each domain 9D and two or more contiguous domains 9D are separated by the patterning of the polymer 12. The well 10, that surrounds the gate area with its walls, is used to bio-functionalize the gate by pouring in the well all the needed solutions for each chemical (C_SAM) or bio-functionalization (B_SAM) step. Between each functionalization step the wells 10 are emptied by pipetting the solution away (or removing the solution with other means) and are washed thoroughly with HPLC-grade water afterwards. So as, also the cleaning steps are accomplished, when necessary, using well 10.

The surface 6F is bio-functionalized by forming the "pixelated" layer of biological recognition elements 9 thereon. Said layer of biological recognition elements 9 includes—in each domain 9D—one of:
- a complex of a chemical self-assembled structure and a biological self assembled structure of one or more specific-binding-pair-forming substances, wherein the biological self-assembled structure is chemically grafted onto the chemical self assembled structure, or
- a biological self assembled structure of one or more specific-binding-pair-forming substances, wherein the structural units of the biological self assembled structure are treated to exhibit grafting properties in respect of the substrate they are intended to graft on i.e. the gold surface of the gate electrode 6.

The specific-binding-pair-forming substances can be attached to the gold layer 6 also by using an anchoring protein such as streptavidin (but also avidin or neutravidin. These biotin-binding proteins can be physically adsorbed to the gold, or can be attached to a C-SAM. A biotinylated specific-binding-pair-forming substances is attached to the streptavidin as well as to avidin in such a case. A G-protein can also serve as specific-binding-pair-forming substances anchoring system. Both these methods will allow to better orientate the specific-binding-pair-forming substances when attached to the gate surface. For more details, see FIG. 2 in Manoli et al. Angewandte Chemie Volume 54, Issue 43, Oct. 19,2015 Pages 12562-12576.

In the preferred embodiment, the layer of biological recognition elements 9 includes a chemical self assembled monolayer (chemical SAM, C_SAM in the figures) and a biological self-assembled monolayer (biological SAM, B_SAM in the figures) of one or more specific-binding-pair-forming substances.

According to the invention, said one or more specific-binding-pair-forming substances include one or more of the following:
- antibodies (one or more) against a selected bio-marker,
- anti-human Immunoglobulin (anti-hIG) antibodies,
- anti-human Immunoglobulin G (anti-IgG) antibodies,
- anti-human Immunoglobulin M (anti-IgM) antibodies,
- anti-C Reactive protein (anti-CRP),
- anti-troponin,
- peptides specific-binding-pair-forming substances for dopamine, chiral odors, DNA, PNA, peptides, polypeptides, human glycoprotein, inflammatory cytokines, C-reactive proteins, viruses.

In embodiments only featuring a biological self assembled structure, the same is a self assembled monolayer of one or more specific-binding-pair-forming substances with a thiol group able to spontaneously attach to the gold surface such as, but not limited to, proteins modified in such a way as to have an exposed cysteine. Direct physical adsorption of capturing proteins or of specific-binding-pair-forming substances is also considered. Namely, the specific-binding-pair-forming substances are let to directly attach (physical adsorption) to the gold surface (cleaned as specified in the following) without the presence of any type of purposely attached C_SAM.

In the preferred embodiment, the gate electrode functionalization method provides that a SAM layer B_SAM of anti-human Immunoglobulin G (anti-IgG, preferred), anti-human Immunoglobulin M (anti-IgM), anti-C Reactive protein (anti-CRP) or anti-troponin, antibodies or peptides be added covering the whole gate surface, and specifically be grafted onto a chemical SAM layer C_SAM applied to the surface 6F of the gate electrode 6 to be functionalized. Clearly, the invention can be practiced with other specific-binding-pair-forming substances (e.g. a selected antibody for a target biomarker) such as for instance tumors or neurodegenerative as well as other progressive diseases biomarkers.

Indeed, the platform here proposed is conceived as a general purpose ultra-sensitive detection tool that can be specified to be selective for a given biomarker as long as the relevant specific-binding-pair-forming substances is available. Moreover, an array of 2-10 biosensor systems as the one introduced in FIG. 5, can be realized to contemporarily quantify a number of bio-markers known to be needed for the diagnosis of a given disease or for the assessment of its progression.

The procedures used to attach the proteins to the chemical SAM to form the biological SAM are general as involve reactions with the exposed amino or carboxy groups (depending on the chosen activation chemistry) that are ubiquitary to all the proteins and also to PNAs that are characteristics solely of the antibodies or other specific-binding-pair-forming substances. This renders the deposition method extendable i.e. to all of the biological species mentioned above (all the antibodies, DNA, PNA, human glycoprotein, or receptors for dopamine, chiral odors, inflammatory cytokines, C-reactive proteins, peptides, troponin). This is therefore an essentially general platform for immunoassay and for bioassay in general.

According to the invention, the one or more specific-binding-pair-forming substances (such as for instance anti-hIg, anti-IgG, anti-IgM, anti-CRP, anti-troponin but also antibodies in general as well as peptides) immobilized in the layer of biological recognition elements 9 (particularly in the biological SAM) are packed at a density comprised between $0.1 \times 10^4$ $\mu m^{-2}$ and $10 \times 10^4$ $\mu m^{-2}$, preferably between $1 \times 10^4$ $\mu m^{-2}$ and $2 \times 10^4$ $\mu m^{-2}$.

In the preferred embodiment, the chemical SAM C_SAM on the surface 6F of the gate electrode 6 is produced by first cleaning the gold free-standing platelet (gate electrode 6) as follows:

first, the gold platelet is Bunsen burnt (flame annealed) for 5 seconds and immersed in a piranha solution [$H_2SO_4$ (97% v/v) and $H_2O_2$ (30% v/v) 3:1 v/v] for 20 min afterwards. The flame annealing can last for about 20 seconds, while the immersion in the piranha can last for $10^{-30}$ minutes.

then, the platelet is kept in boiling water for 10 minutes, then treated for 10 min in an ozone cleaner.

Alternatively, the gate electrode surface can be polished by a cyclic voltammetry based technique, commonly termed as 'electrochemical polishing'. Cyclic-voltammetry polishing can be carried out in three electrodes configuration using an electrochemical analyzer.

Ag/AgCl electrode in KCl solution is used as reference electrode, 0.5 M sulfuric acid ($H_2SO_4$ (97% v/v)) can be used as electrolyte in the electrochemical cell. The gate electrode 6 is placed as working electrode held in the solution using a standard electrode holder.

A platinum plate of relatively large area, approximately 10 times larger than that of the gold working electrode 6 serves as control electrode. The potential is scanned between 0V to +1.5 V for at least 30 cycles. The scan rate is maintained at 0.1 V/s. Before every measurement, the electrolyte solution can be replaced with fresh solution and $N_2$ is bubbled through the electrolyte for at least 10 minutes to remove the dissolved oxygen contents.

After electrochemical polishing, the gate electrode 6 is thoroughly rinsed with ultra-pure HPLC grade water and then with ethanol, and dried under a gaseous nitrogen ($N_2$) stream.

Alternatively, the gate electrode 6 can be deposited or defined as a thin film, by thermal evaporation or electron beam deposition of Ti (50 nm) and Au (50 nm) as well as by thermal evaporation through a shadow mask or by printing on a flexible substrate such as poliimmide, mica, poly (ethylene 2,6-naphthalate) or polyethylene terephthalate, but also on rigid substrates such as Si/$SiO_2$ or glass or rigid plastic. This gate before the bio-functionalization is cleaned as follows: isopropyl alcohol (IPA) ultrasound bath for 10 min; immersion in boiling water (high performance liquid chromatography—HPLC grade) for 10 min; UV/ozone surface cleaning for 10 min. The described electrochemical polishing can be used also on the thin-film gate.

After the polishing of the gold gate electrode, with reference to FIGS. 4A-4C, the domain pattern of the layer 9 is provided according to the different methods displayed therein.

The areas 6A (and consequently the number of domains or "pixels" 9D) are then delimited according to one of the following procedure:

the gate electrode 6 can be defined by fabricating a number of strips 12 that delimit the 9D pixel areas. Depending on the width of the strip either shadow masking, photolithography or e-beam lithography. The width of the strip can range from 1 μm to 10-100 μm. The height of each strip will be of 0.1 μm-3 μm. So, starting from the gate electrode plate 6 (FIG. 4A), the surface opposite to the substrate 1 is patterned into a plurality of bare gold areas 6A that are delimited by strips 12 made of photoresist or other hydrophobic patternable amorphous fluoropolymers polymers such as Cytop that are inert and do not dissolve in water.

To provide such strips photolithography or electron-beam lithography can be used. Depending on the size of the features to be defined also printing can be used. In the case of photolithography, a photoresist such as AZ5214 E is used to cover the whole gold thin-film previously deposited in the insulating substrate. The photoresist is deposited by spin-coating (3000 rpm for 30 seconds) so as a thin photoresist layer (~0.5-3 μm in thickness) is formed. In the case of electron-beam lithography, the polymetilmetacrilate (PMMA) is used. After cleaning the PMMA resist is dispensed by spin-coating at 1000 rpm for 20-60 seconds. The resulting resist thickness is 100-500 nm. A soft bake of the samples is carried out on a hot plate: at 90° C. for 30-80 seconds for the photoresist, and at 180° C. for 50-120 seconds for the PMMA resist.

The photolithography is carried out with a UVL quartz mask having a side chromed with a pattern identical to the strip network 12 that delimit the 9D pixel areas. The mask-chromed side is put in contact with the sample and the photoresist is exposed to UV light (180-3000 mW) for 20-50 seconds. The EBL allows to fabricate the strips 0.5-1 m wide. The parameters for the EBL process are: 1-20 kV of applied voltage, 1-100 $\mu C/cm^2$ of dose, 10-500 pA of beam current. Finally, the developing; for the photoresist, the samples are immersed and slowly stirred in the development solution (AZ 726 MIF for instance) for 40-60 seconds. The development is stopped placing the sample under a deionized water flow and dried with a nitrogen flow. In case of PMMA, the samples are dipped in the development solution (such as for instance AR 600-56), and sonicated for 20-60 seconds. The samples are then immersed in IPA and again sonicated for 20-60 seconds, then dried in a nitrogen flow.

Figure 3B:
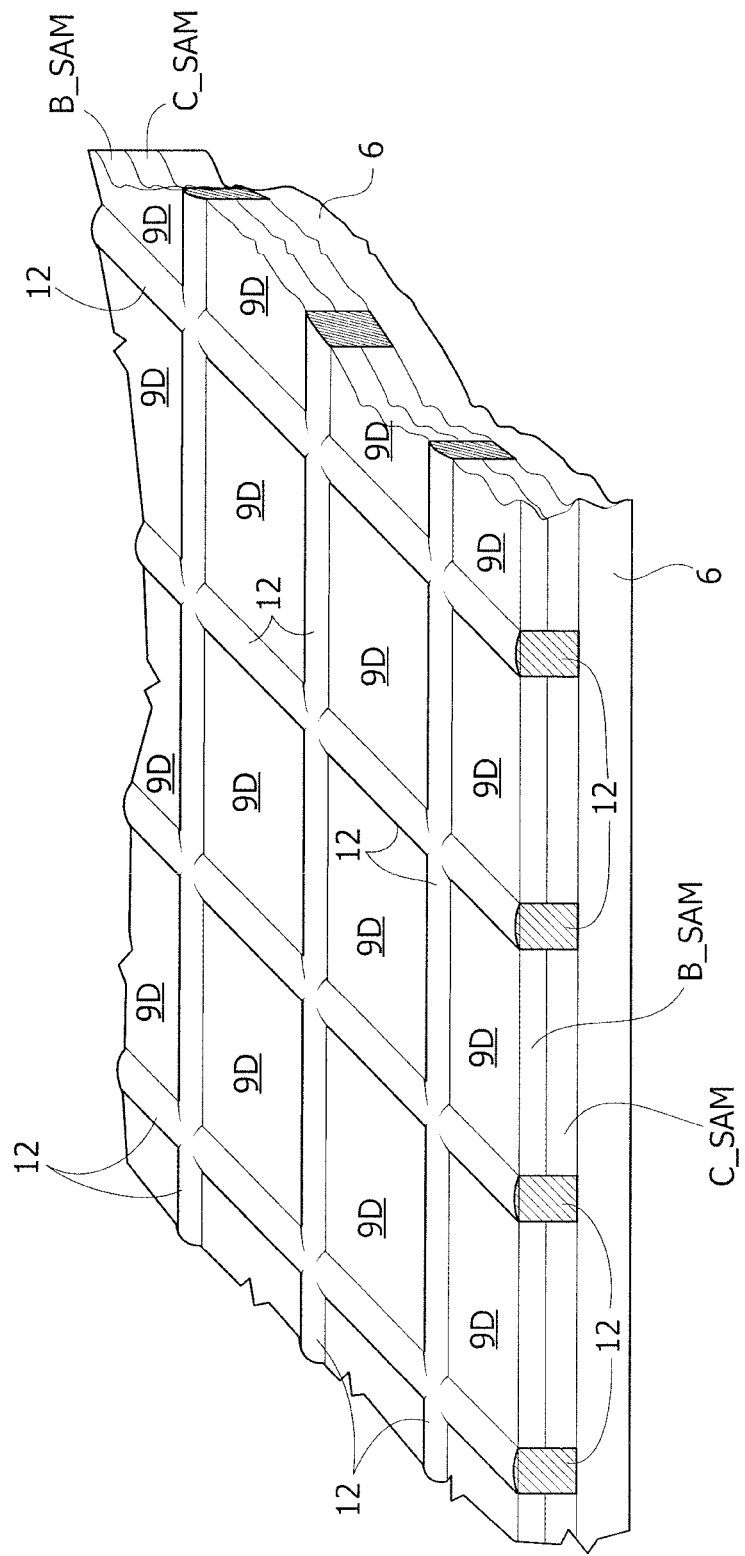

It should be noted that photoresist strips 12—as better shown in FIG. 3B—remain in place even following functionalization of the gate electrode 6: this is a provision intended to avoid damage to the biological recognition layer 9 (patterned into domains 9D) should photoresist be washed away by an acid solution. Photoresist also concurs in providing decoupling of the domains 9D in so far as it is other than a ionic conductor.

A second way to define hydrophobic strips on a gold thin-film is by photolithographically patterning a Cytop film with thickness of 2-4 micrometers. The Cytop film is deposited by spin coating (1500 rpm) followed by baking at 50° C. for 1 hour+baking at 180° C. for 1 hour in an oven. Photolithography will be carried out to define a pattern identical to the strip network 12 that delimit the 9D pixel areas. Resist fluid (Tokyo Ohka Kogyo Co., Ltd.) OFPR-800 or similar will be used. The resist will be deposited by spin coating at 2000 rpm, followed by baking at 90° C. for 20 minutes. The mask-chromed side is put in contact with the sample and the photoresist is exposed to UV light (152 mJ/cm2) for 40-second followed by baking at 90° C. for 20 minutes. Oxygen reactive ion etching is used to remove the Cytop film from the domain areas 9D. Finally, the photoresist will be removed by immersion in Peel fluid 106 (Tokyo Ohka Kogyo Co., Ltd.) for 3 minutes followed by immersion in IPA and rinsing with ultrapure water.

The aim of these processes is to define hydrophobic strips that will isolate contiguous pixels of bare gold where the specific-binding-pair-forming substances can be grafted. Since the strips covers the gold and are hydrophobic, neither the chemical SAM (C_SAM) nor the biological one (B_SAM) will adhere to the strips surface therefore acting as a decoupling systems between contiguous bio-functionalized pixels. This strips will therefore impede the spreading of the change induced by the binding event that involves a specific-binding-pair-forming substance ones in contact with the targeted bio-marker. Namely it would impede the biosensor rapidly from becoming "blind" to further ligand recognition events. The number of pixels 6A (and consequently the number of domains 9D) that are defined may range up to 1000 depending on the area of the gate, the size of the strips and the concentration dynamic range needed for the final application.

Then, in the preferred embodiment the chemical SAM layer C_SAM is added to the gate electrode 6 patterned with the strips, by means of a precursor consisting of a layer of alkanethiols, some or all of them terminating with carboxylic functionalities, which is deposited on the surface 9.

To this end, a 10 mM solution consisting of 10:1 ratio of a 3-mercaptopropionic acid (3-MPA) to 11-mercaptoundecanoic acid (11-MUA) was prepared in ethanol grade, puriss. p.a. assay, ≥99.8. Alternatively, the 3-mercaptopropionic acid can be substituted with 1-Butanethiol or other short (3 to 5 carbons chains) mercaptans (thio-alcohols, TA).

The cleaned and pixelated gold surface (FIG. 4B) with the bare and cleaned gold regions 6A, is immersed in the 3-MPA and 11-MUA solution and kept in the dark (i.e. in the absence of visible and UV light) under constant gaseous nitrogen ($N_2$) flow for eighteen (18) hours at 22° C.

The inventors have however observed that, in addition to the preferred parameters above, the same step can be practiced with a solution having a concentration in the range 10 mM to 100 mM, consisting of a 10:1 to 1:1 ratio of a 3-mercaptopropionic acid (3MPA) or mercaptans (thio-alcohols) to 11-mercaptoundecanoic acid (11 MUA) in ethanol grade, but also composed by the sole 3-mercaptopropionic acid or the sole 11-mercaptoundecanoic acid, and immersing the gate electrode 6 therein for a residence time comprised between 15 and 24 h and at a temperature of 15 to 28° C.

The strong gold-sulfur interaction results in the exposure of the carboxylic groups, activated subsequently by reacting the partially processed gate electrode as per the above in a 200 mM 1-Ethyl-3-(3-dimethylaminopropyl)carbodiimide (EDC) and 50 mM sulfo-N-Hydroxysuccinimide (sulfo-NHS) aqueous solution for two (2) hours at 25° C.

Again, the inventors have however observed that, in addition to the preferred parameters above, the same step can be practiced by reacting the gate electrode 6 in a 50 mM to 250 mM 1-Ethyl-3-(3-dimethylaminopropyl)carbodiimide (EDC) and 50 mM to 250 mM sulfo-N-Hydroxysuccinimide (sulfo-NHS) for a residence time comprised between 1 and 3 h and at a temperature of 22 to 28° C. An N-Hydroxysuccinimide (NHS) aqueous solution can be used instead of the sulfo-NHS one.

In the preferred embodiment, the anti-human Immunoglobuline G (anti-IgG) or the anti-human Immunoglobuline M (anti-IgM) SAM layer (biological SAM) is thus generated through the anchoring of the antibodies (or generally of the specific-binding-pair-forming substance) to the chemical SAM C_SAM, specifically to the carboxy groups linked to the sulfo-NHS or to the NHS moyeties resulting from the chemical activation described in the previous paragraph, by immersing the gate electrode 6 in a Phosphate Buffered Saline (PBS) solution containing the antibodies for two (2) hours at 25° C.

The Phosphate Buffered Saline (PBS) solution may consist of 0.1-1 mg·ml$^{-1}$ of antibodies such as, but not limited to, anti-IgG or anti-IgM and 5 mM to 25 mM of phosphate buffer having a pH in the range 5 to 8 and a physiologically relevant ionic strength in the range 10 mM to 200 mM.

In the preferred embodiment, the solution consists of 0.7 M (0.1 mg ml$^{-1}$) of antibodies in PBS made by 10 mM phosphate, KCl 2.7 mM and 137 mM NaCl having a pH of 7.4 and a ionic strength of 162 mM.

Once again, the inventors have however observed that, in addition to the preferred parameters above, the same step can be practiced by immersing the gate electrode 6 in a buffer solution comprising anti-IgG antibodies or anti-IgM antibodies (other antibodies in general as well as specific-binding-pair-forming substances), wherein the buffer solution comprises one of:
Na phosphate buffer solution of Dulbecco's phosphate buffered saline (D-PBS, KCl: 2.7 mM, NaCl: 136 mM, $KH_2PO_4$: 1.5 mM, $Na_2HPO_4$: 8.1 mM)
Phosphate buffer solution 20 mM and pH 8 for a residence time comprised between 15 min to 3 h and at a temperature of 23 to 26° C.

Moreover, the antibody solution (anti-IgG, or the anti-IgM for example) shall have optimal pH and ionic strength depending on the source of antibodies.

Suitable pH values are in the range from 5 to 9 and ionic strength from 10 mM to 200 mM.

Other buffers that can be used to practice the method according to the invention include (depending on the desired pH value): Tris-HCl, phosphate, citrate, imidazole-Cl, PIPES, ACES MOPSO, BES, TES, MOPS, DIPSO, TAPSO, HEPPSO, POPSO, TEA, EPPS, Tricine, Glycine, Bicine, HEPBS, TAPS, AMPD, Borate.

The ionic strength can be adjusted by any salt that does not interfere with the covalent attachment of the antibody to the gate and with the native conformation of the antibody. Commonly used salts are NaCl and KCl.

Alternatively, the following protocols can be used to attach different biological recognition elements that will endow the biosensor BS (specifically when the same is embodied as a EG-OFET) of a good degree of selectivity. Namely for instance:
a SAM from cystamine 1 mM aqueous solution with subsequent covalent immobilization of 4-formylphenylboronic acid saturated in 1,4-dioxan at 40° C. for 2 h to detect dopamine.
The physical adsorption of: histidin-tagged protein G (5 mg/mL) in PBS (100 mM of PBS, pH 7.4) to attach IL4 monoclonal antibody (0.25 mg/mL anti-IL4) for 1 h at 5° C. to detect interleukin-4.
A SAM functionalization: 50 mM solution of 3-mercaptopropionic acid (3MPA) in ethanol containing 5% acetic acid under nitrogen, in the dark for 18 h at 22° C. Activation: 100 mM EDC and 200 mM NHS aqueous solution for 1 h at 25° C. Covalent immobilization of odorant binding proteins, pOBPs, (0.7 mg ml$^{-1}$ in 20 mM Na phosphate buffer, pH 8.0), 2 h at 25° C., to detect chiral odors such as carvone.
Covalent immobilization: reduced thiolated ssDNA-probes (7 pmol/cm$^2$), on floating gate electrode in Tris buffer (10 mM Tris, 1 mM EDTA, pH 8.0) at 0.1 M NaCl for 2 h. Rinsed with Tris without NaCl.
SAM: 10-carboxy-1-decanethiol (1 mM in hexane) 1 h, room temperature. Washing with ethanol and water. Activation: 5 µl 2-morpholino-ethane-sulfonic acid buffer solution (MES, 100 mM, pH 6.0) containing 5 mM sulfo-NHS, N,N'-di-isopropyl-carbodiimide (DIC, 40 mM) and sodium chloride (500 mM), 15 min. Covalent immobilization: Streptavidin (500 g/ml) in 5 µl of a carbonate buffer solution ($Na_2CO_3$: 15 mM, $NaHCO_3$: 35 mM, pH 9.6) on electrode, 15 min. Physical adsorption: immersion in D-PBS containing 0.05 wt. % Tween 20, 0.1 wt. % BSA, 15 min.
SAM: 5-carboxy-1-pentanethiol. Activation: 5 µl 2-morpholino-ethane-sulfonic acid buffer solution (MES, 100 mM, pH 5.5) containing 5 mM sulfo-NHS, DIC (40 mM), 15 min. Covalent immobilization: Streptavidin (500 µg/ml) in 5 µl of a carbonate buffer solution ($Na_2CO_3$: 15 mM, $NaHC_3$: 35 mM, pH 9.6) on electrode, 2 h, room temperature. Physical adsorption: immersion in D-PBS containing 0.05 wt. % Tween 20, 0.1 wt. % human serum albumin (HMS), 15 min. Incubation in biotin-tagged anti-CgA antibody (30 µg/mL) with 0.1 wt % HSA PBS solution, 30 min, room temperature.

Once the anti-IgG or the anti-IgM SAM B_SAM is set in place there is the need to "block" the bio-functionalised layer 9 (this applies to whatever specific-binding-pair-forming substance the SAM is made of). Specifically, the layer of biological recognition elements 9 is treated with a solution containing one or more blocking agents to fill vacancies and prevent nonspecific binding in the self-assembled structure.

In the preferred embodiment, this is performed via saturation of the unreacted activated carboxy groups of the functionalized chemical SAM layer, particularly by means of concentrated solutions of amines for a time long enough to allow the reaction with all the activated carboxylic groups (usually from 30 min to few hours). The amines can be supplied as additive in a buffer (such as ethanolamine 1 M in PBS) or can be the rinsing buffer itself (such as Tris).

To this end the anti-IgG or anti-IgM layer in the preferred embodiment is treated with ethanolamine 1 M in PBS for one (1) hour at 25° C.

Finally, the bio-functionalized gate electrode 6, particularly the layer 9, is immersed in a 1.5 µM (0.1 mgml$^{-1}$) BSA (Bovine Serum Albumine) solution in PBS 10 mM for one (1) hour at 25° C. Therefore, in the preferred embodiments ethanolamine and BSA are used as blocking agents.

The inventors have however observed that the blocking step can be practiced by immersing the bio-functionalized gate electrode 6, particularly the layer 9, in a 0.05 to 1 mg ml$^{-1}$ BSA solution in buffer at pH=7.4 composed by phosphate 5 mM to 20 mM and at ionic strength ranging from 80 mM to 350 mM for a residence time comprised between 30 min and 2 h, and at a temperature comprised between 22° C. and 26° C.

Alternatively, other blocking agents include Human Serum Albumin (0.01-3% W) Tween 20, casein or 1 mM 6-mercaptohexanol (MCH), 2-aminoethanol (1 M) in 5 µl of Dulbecco's Phosphate Buffered Saline (D-PBS, KCl: 2.7 mM, NaCl: 136 mM, $KH_2PO_4$: 1.5 mM, $Na_2HPO_4$: 8.1 mM). The exposure (residence time) to these solutions can vary from 15 minutes to 3 hours.

The "surface blocking" step as described above is generally carried out to minimize the non-specific binding. The inventors have also noted that, when performed in a method according to the invention, such a step can also drastically improve the sensitivity of the biosensor BS. The molecules used to "block the surface" minimizes non-specific adsorption of biomolecules to the gate electrode areas that are not fully covered by the anti-IgG or the anti-IgM (or more in general by antibody proteins). Additionally, the BSA also works as—so to say—a mechanical and electrostatic coupler for the biological self assembled structure.

The interdigitated S and D pattern 4 is further covered by a semiconductor layer 7 disposed thereon, which is in turn covered by a ionic-conducting material.

Preferably the semiconductor 7 is organic and is made of a printable organic material (P3HT, PEDOT-PSS, PBTTT-Cx)

In a preferred embodiment, the semiconductor 7 is made of hydrophobic poly(3-hexylthiophene-2,5-diyl)—or P3HT—exhibiting the following properties: regioregularity >99%, average molecular weight of 17.5 kDa g mol$^{-1}$. A P3HT solution (2.6 mg ml$^{-1}$ in 1,2-dichlorobenzene) filtered with a 0.2 µm filter was spin-coated at 2.000 r.p.m. for 20 s and annealed at 80° C. for 1 (one) hour. In the preferred embodiment, the total semiconductor area is 6.5 $10^{-3}$ $cm^{-2}$.

The P3HT surface is highly hydrophobic as the contact angle is as high as 103±3°. Alternatively, poly[2,5-bis(3-tetradecylthiophen-2-yl) thieno[3,2-b]thiophene](PBTTT-C14), poly(2,5-bis(3-hexadecylth-iophene-2-yl)thieno[3,2-b]thiophene (pBTTT-C16), pBTTT-C14 as well as solution processed pentacene, graphene, can also be used as a material for the semiconductor 7.

Specifically, PBTTT-C14 can be dissolved (7 mg/ml) in a mixture of 1,2-dichlorobenzene and chloroform (in 9:1 ratio). PBTTT-C14 solution can be spin deposited at 7,000 r.p.m. for 60 s and annealed at 120° C. for 10 min.

Yet alternatively, bidimensional materials can be used such as e.g. graphene or phosphorene as well as Indium Gallium Zinc Oxide (IGZO) or carbon nanotubes.

Additional details as to preferred functionalization and biosensor manufacturing methods overall may be found i.a. in European Patent Application 16207596.4 filed on Dec. 30, 2016 in the name of the same Applicant.

As anticipated, the invention also deals with a novel BS structure that enables the semiconductor (layer 7), even when not fully stable in a water environment, to be in electrical contact with a water electrolyte or even a bio-fluid by adding a hydrophobic ionic conducting material (layer 8) to cover and possibly seal the semiconductor layer itself. Such a layer being ionically conductive, while physically covering and protecting the semiconductor from water, does not impairs the capacitive coupling between the gating medium and the FET channel, thus allowing the field effect channel to be installed into the semiconducting layer by the high capacitance charge double layer induced at the interface with the ionic medium.

If layer 7 is sufficiently stable in water it will not be covered by layer 8. The semiconductor layer 7, before the deposition of layer 8, can be treated chemically or with a mild plasma to add on the surface hydrophobic functionalities such as hydrocarbons, silicon or fluorinated compounds also to enhance the chemical adhesion of the gating system. Examples of the chemical and plasma treatments are the followings: monolayers of long chain hydrocarbons or fluorinated carbons, silicon oil, plasma enhanced chemical vapor deposition of polyethylene-like, silicon-like or fluorinated plasma-polymer thin films.

The ionic conducting material 8 covering the semiconductor layer 7 may be chosen as one of:
a ionic-conducting-electron-insulating (ICEI) liquid,
a ionic-conducting-electron-insulating solid
a ionic-conducting-electron-insulating gel layer
just HPLC-grade water.

In another embodiment, the ionic-conducting material includes one of the following:
a ionic liquid
ionic gels such as water insoluble polymers (e.g. PS-PMMMA-PS or PS-PEO-PS) and hydrophobic ionic liquids, The ionic conducting material 8 can be deposited by various methods including spin or cast-deposited but also printed and, in embodiments wherein such material is solid ICEI layer, the same can be thermally treated afterwards.

Preferably the ICEI layer 8 is hydrophobic to protect the semiconductor 7 from water.

However, in embodiments wherein the semiconductor 7 is made of PEDOT-PSS or of other conducting polymers materials (i.e. materials that are both electronic and ionic conductors), the ICEI layer 8 is absent and layer 7 is directly in contact with a water based solution, because water penetration into the PEDOT-PSS layer is needed to allow the electrochemical doping of the semiconductor 7.

Examples of these solutions include as phosphate buffer saline solution as well as other buffer solutions including,
Na phosphate buffer solution of Dulbecco's phosphate buffered saline (D-PBS, KCl: 2.7 mM, NaCl: 136 mM, $KH_2PO_4$: 1.5 mM, $Na_2HPO_4$: 8.1 mM)
Phosphate buffer solution 20 mM and pH 8.

Yet other buffers that can be used to practice the method according to the invention include (depending on the desired pH value): Tris-HCl, phosphate, citrate, imidazole-Cl, PIPES, ACES MOPSO, BES, TES, MOPS, DIPSO, TAPSO, HEPPSO, POPSO, TEA, EPPS, Tricine, Glycine, Bicine, HEPBS, TAPS, AMPD, Borate.

The biosensor BS furthermore includes the already introduced well 10 delimiting the sole gate area. The well 10 is open at the top to allow pouring of the solutions in it. It can be realized by moulding or 3D printing and it fully surrounds the whole gate surface. Alternatively, with reference to FIG. 2D, the well can be realized by excavating into the substrate or be generating by bidimensional (2D-) printing a well into a rigid plastic substrate so as to contain a liquid volume, ranging from 10 to 1000 µl, to be in contact with the gate surface. These can be all the solutions needed to functionalize the gate or containing any biomarker solution to be put in contact with the biological recognition layer 9 to incubate for a sufficiently long time to allow the binding to occur.

A second—wider—well 11 extends over an area covering both the gate electrode 6 and the ensemble including the interdigitated pattern 4 and the semiconductor 7 covered by layer 8. Also well 11 is open at the top to allow the pouring of the solutions. The well 11 is preferably filled with HPLC-grade water that serves as an electrolyte in order for the biosensor BS to operate as an electrolyte-gated FET (EG-FET, L. Torsi et al Chem. Soc. Rev., 2013,42, 8612-8628) or an electrochemical FET (J. T. Mabeck, G. G. Malliaras, Anal. Bioanal. Chem., vol. 384, pp. 343-353, 2006) to perform the electronic and sensing measurements.

In the embodiments of the biosensor BS wherein the semiconductor 7 covered by layer 8 or not, is coupled to HPLC grade water in the well 11. PBS based electrolytes at different pH (ranging between 6.5 and 8) ionic strength (in the 0.001-100 mM range) can be used as well. Through layers of a hydrophobic ICEI polymer or gel, the biosensor is configured to operate as an electrolyte-gated FET by preserving the semiconductor 7 from direct contact with water.

Conversely, in embodiments wherein PEDOT-PSS is used as semiconductor 7, the biosensor BS operates as an electrochemical transistor and no ionic conductor is needed between the PEDOT-PSS layer and the gating electrolyte in the well 11 that in this case can be directly a buffer solution, particularly a phosphate buffer solution (PBS) made by 10 mM phosphate, KCl 2.7 mM and 137 mM NaCl having a pH of 7.4 and an ionic strength of 162 mM. The inventor noticed that, while these are the preferred solution also PBS made by 1-100 mM phosphate, KCl 5-7 mM and 50-250 mM NaCl having a pH of 6.5-8 and an ionic strength of 10-1000 mM can be used.

In further embodiments such as that schematically depicted in FIG. 5 the biosensor BS includes a plurality of gate electrode plates 6, each featuring a corresponding layer of biological recognition elements 9 patterned into a plurality of uncoupled domains 9D and each separately enclosed in a respective well 10 (the well 10 encloses both the gate electrode 6 and the layer 9).

In the preferred embodiment shown in FIG. 5, the biosensor BS includes four gate electrode plates 6. Three are covered with the layer B_SAM of biological recognition elements (G1, G2 and G3) and one ($G_G$) is left as a bare gold layer that is neither chemically functionalized nor patterned into domains, and that functions as internal reference.

The current reference level will be set by measuring the output current of the transistor formed by $G_G$ gate and the electronic channel defined in the in the middle of the array (FIGS. 5 and 5A), coupled through the water poured in well 11. Before and after the measurement of a dose curve (vide infra) using either one of the other gates coupled to the same electronic channel, the current will be measured using $G_G$. The difference of the current level provided by this "reference" transistor, before and after the evaluation of a dose curve, will set the level of performance of the electronic channel during the sensing measurement and can be used for calibrating or quantitatively comparing the output currents measured on the samples with that of the relevant calibrating curves or control experiments.

While $G_G$ is formed just by the gold 6 layer, gates G1, G2 and Gn comprise biological recognition domains 9D functionalized as described above after having patterned the gate into a plurality of uncoupled domains 6A. The four gate electrode plates 6 are arranged cross-wise around the ensemble including the source and drain channel 4 and the semiconductor 7, i.e. they are arranged around and parallel to respective sides of the ensemble including the interdigitated S and D pattern 4 and the semiconductor 7 to line up pairwise along two orthogonal directions as if they were the arms in a cross.

Separate contact pads are provided for each of source (S, 2), drain (D, 3), and gates G1, G2, G3, $G_G$ in FIG. 5 and are arranged comb-wise (in a linear array) on one side of the substrate to allow docking of the biosensor BS to a processing equipment by way of a communication socket/slot. Contact pads are labeled by the same references designating components connected thereto (2, 3, G1, G2, G3, $G_G$). A circular docking can be conceived for the structure reported in FIG. 5A.

A well 10 surrounds each gate so as to allow a solution to stay in contact with the gate surface. It will be squared shaped for the system in figure % and circular for the one in FIG. 5A. Well 10 serves either to contain all the solutions needed to functionalize the gate or to expose it to the different biomarker standard solutions. Well 10 (0.2-1 cm in height), is realized by 3D printing or molding and attached on the substrate as reported in FIG. 2.

Alternatively, wells 10 can be realized as structures that are drilled in the substrate as square or circular holes 0.2-1 cm deep as shown in FIG. 2D. The gate is fabricated as previously described on the bottom of the well (well 10B, FIG. 2D).

The well 11, also realized by 3D printing or plastic molding techniques and attached to the substrate is accordingly cross-shaped to accommodate all of the wells 10 (made of the same material) and the ensemble including the interdigitated S and D pattern and the semiconductor 7. For structure in FIG. 5A well 11 is circularly shaped. Well 11 has a height of 0.5-2 cm being at least double the height wells 10 so as the whole area within the well 11 is in ionic contact when this well is filled in with the gating electrolyte.

Well 11 is filled in with the gating electrolyte (HPLC grade water or PBS) to operate the transistor by biasing the transistor as reported in the following. Each gate has its own pad to be connected to the $V_G S$ bias (applied through an external circuit or system) when in use.

The gold gate ($G_G$) is used at first to measure the current level flowing in the transistor before the sensing is performed. This current is addressed as CL1. The other gates (G1, G2, G3) are all functionalized with the receptor (specific-binding-pair-forming substance) for the biomarker (ligand) to be analyzed. For instance, the gates can be functionalized with anti-IgG if the biomarker of interest is IgG. The G1 is used to perform the calibration curve by using standard solutions of the ligand in PBS 10 mM, pH 7.4 for instance. Solutions of IgG ranging from 6 zM to 6 nM can be used. The more diluted solutions should not contain any ligand. After the whole calibration curve is measured, the level of the current on the $G_G$ gate is measured (CL2) and the relative difference between CL1 and CL2 asses the level of error (associated with changes in the transistor base-line current) that is associated with the measurement. It also serves for calibration purposes when the response of the calibration curve is to be compared with the measurements made on the progressively diluted sample to be assayed (saliva, serum, spinal fluid, tears, sweet, water from rivers, seas, drinkable water, food, beverages, etc.). Moreover, if the relative variation of the current levels measured on the on $G_G$ before and after the dose curve is too high (preferably when larger than 3-5% but depending on the amplitude of the sensing response also larger than 10-20%) and in the same direction of the sensing response, the sensing dose curve is discarded. G2 is used to detect the biomarker (ligand) in the bio-fluid to be analyzed, for instance saliva. The bio-fluid is diluted 1:10 for n-times (ranging from 1 to 21) until the most diluted solution does not give any response in the transistor. Gate G3 can be used to measure a replicate either of the calibration curve in PBS or of the sample. Alternatively, G3 can be used for negative control experiments. In this case for instance a dose curve for IgM is used on an anti-IgG patterned gate. For the structure proposed in FIG. 5A the extra gates can be used to perform replicates either of the dose curve or of the measurements of the bio-marker in the progressively diluted sample fluid.

In alternative embodiments, with reference to FIGS. 5A and 5B, a circular geometry can be adopted for major components of the biosensors BS.

In the embodiment of the biosensor BS depicted in FIG. 5, on the substrate 1 (which may be circular as well in accordance with FIG. 5A or else quadrangular with comb-wise contact pads as per FIG. 5) eight gate electrodes $G_G$, G2, G3, G4, G5, G6, G7, G8 are arranged along a circumference, preferably equally spaced. In general, the circular arrangement may allow a higher use of available space on the substrate 1 than the crosswise arrangement of FIG. 5. As per the embodiment of FIG. 5, the gate $G_G$ is left as a bare gold layer that is neither chemically functionalized nor patterned into domains, and that functions as internal reference, while the gates G2, G3, G4, G5, G6, G7, G8 (and in general G2 to Gn) each feature a corresponding layer of biological recognition elements 9 patterned into a plurality of uncoupled domains 9D and each separately enclosed in a respective well 10 (the well 10 encloses both the gate electrode 6 and the layer 9).

The extra gates compared to other embodiments disclosed herein can be used to either quantify more biomarkers or to have more replicates of the same dose curves.

The complex including the interdigitated source and drain pattern 4 (source and drain channel 4), the semiconductor 7 set on top of the source and drain channel 4, and the well 8 (open at the top) enclosing both the source and drain channel 4 and the semiconductor 7 is arranged at a position corresponding to the center of the circumference whereon the gates $G_G$ and G2 to Gn lie. Details of the source and drain channel 4 are provided in the enlarged view of FIG. 5B (including S and D pads 2, 3).

The larger well 11 surrounds and encloses all of the gates $G_G$ and G2 to Gn and the well 10. The well 11 is open at the top as described above.

Contact pads 5 are provided in association to each gate electrode $G_G$ and G2 to Gn, either arranged along a circumference external to that of the gate electrodes and external to the well 11, or arranged combwise on a side portion of the substrate 1 (again outside of the well 11), depending on the embodiment.

All of the electrical connections between a contact pad 5 and the respective gate G2-Gn, as well as between the contact pads 2, 3 and the source and drain channel 4 are electrically insulated.

By way of summary, each of the embodiments of FIGS. 5, 5A includes, further to a plurality of gate electrodes with a layer of biological recognition elements patterned into a plurality of uncoupled domains 9D, a bare gate electrode 6, $G_G$ free of the layer of biological recognition elements 9 patterned into uncoupled domains 9D, wherein the bare gate electrode being enclosed in a respective first well (10).

The plurality of gate electrodes with a layer of biological recognition elements patterned into a plurality of uncoupled domains 9D and the bare gate electrode 6 are arranged, alternatively, crosswise (G1, G2, G3, $G_G$) or along a circumference (GG, G2, G3, G4, G5, G6, G7, G8). Other arrangement allowing a certain degree of central symmetry, (not necessarily a perfect central symmetry, but in principle any arrangement wherein a central or core location can be identified are usable as alternatives.

Gate arrangements based on a central symmetry correspond anyway to preferred embodiments. It is noted that both the arrangements shown in the figures (cruciform and circular) correspond to central symmetry arrangements: this is apparent as far as the circular arrangement is concerned, while for the cruciform arrangement it should be observed that the same corresponds to positioning the gate electrodes G1, G2, G3, $G_G$ at polar locations around a circumference, with the source and drain channel 4 at a position corresponding to the center of symmetry. Whatever the arrangement, the source and drain channel 4 is positioned in what is the center of symmetry or else the central point of the corresponding arrangement featuring a certain degree of central symmetry.

A complex including the source-drain channel 4 and the semiconductor layer 7 is arranged at a central position of the crosswise arrangement or the circumference arrangement (or the arrangement in general), respectively, and is enclosed in a respective first well 10. The second well 11 encloses all of the first wells 10 and accordingly the components in turn enclosed by the latter.

Basically, the biosensor BS of FIG. 5 featuring three pixelated gates and one bare gold gate is used for single analyte recognition, while the biosensor BS of FIGS. 5A and 5B is used both for single and multi-analyte recognition (especially multi-analyte).

It should also be noted that multi-gated biosensors retaining the central symmetry gate arrangement and featuring one bare gate electrode, preferably a bare gold electrode, could also advantageously be used in combination with non-pixelated gate electrodes (i.e. gate electrodes featuring only one pixel covering the whole gate surface). This means that based on a different advantageous aspect of the invention, a biosensor could be set up by retaining the multi-gate arrangement detailed above while reverting to a more conventional design for the functionalized gate electrodes compared to those in FIGS. 5, 5A, 5B. Such biosensors have been determined to be particularly useful when a biological recognition event is sought for when only few biomarkers are present, even if this were to mean at a single molecule level. The non-pixelated gate is in general not capable of providing a large dynamic range, as already anticipated, but has been tested satisfactorily for these events. The gate electrodes other than the bare electrode can be functionalized by any of the methods described or recalled herein, albeit without the domain patterning steps.

Essentially, another class of field effect transistor sensors can be defined including:
a substrate 1,
a source electrode 2, 4
a drain electrode 3, 4
one or more gate electrodes functionalized with a layer 9 of biological recognition elements,
one gate electrode being a bare gate electrode free of a layer of biological recognition elements
a source-drain channel 4
a semiconductor layer 7
wherein the one or more gate electrodes functionalized with a layer of biological recognition elements and the bare gate electrode are arranged according to a central symmetry pattern with a complex including the source-drain channel 4 and the semiconductor layer 7 arranged at a central position of the central symmetry pattern. Such a complex is in turn enclosed in the well 8, while each of the gate electrodes is enclosed in a respective well 10. The well 11, as described in the foregoing, encloses all of these elements and the respective wells (source and drain channel 4+semiconductor 7+well 8, as well as gates+respective wells 10).

Clearly, biosensors according to the invention and embodied by FIGS. 5, 5A, 5B could also be used successfully in recognition events involving very few biomarkers, however due to the very low number of biological recognition events the pixelated structure of the biological recognition layer of the gate electrodes would essentially operate at a very low percentage of its actual capabilities, wherefrom benefit can be enjoyed with multiple recognition events, involving more biomarkers, that are all detected without any "blinding" effect on the functionalized gate thanks to the uncoupled domain pattern of the biological recognition layer 9.

The biosensor BS according to the invention operates as follows. although the description below is provided specifically in respect of the biosensor BS featuring a cruciform gate arrangement, the same is valid for the biosensor BS of FIGS. 5A, 5B featuring a circular arrangement.

The bio-functionalized and pixelated gate 6, composed of a number of 9D regions, is brought in contact with the affinity ligands of the biological-recognition elements attached as SAM on its surface or with any other species chosen as negative and positive control species. This occurs with the gate 6 incubated in the solutions of the bio-marker to be detected. The solution is poured in the well 10 surrounding the gate in use.

Generally, the incubation can last from some minutes to few hours. Preferably 10 minutes. The biomarker solution can be a standard solution made for instance of 10 mM phosphate buffer saline (PBS) solution at 7.4 pH that contains a known amount of the target biomarker. Alternatively, the buffer solution may be a real biological sample of diluted or whole saliva, blood serum, sweat, spinal fluid, etc.

After incubation, the well 10 is emptied (for instance with a pipet or via a microfluidic inlet and outlet system) and washed thoroughly with HPLC grade purified water. Water or PBS for the electrochemical transistor, is poured into well 11. As the walls of well 11 are higher than those of wells 10, the biased gate and the transistor channel are capacitively coupled through a continuous layer of water based solution.

Figure 6:
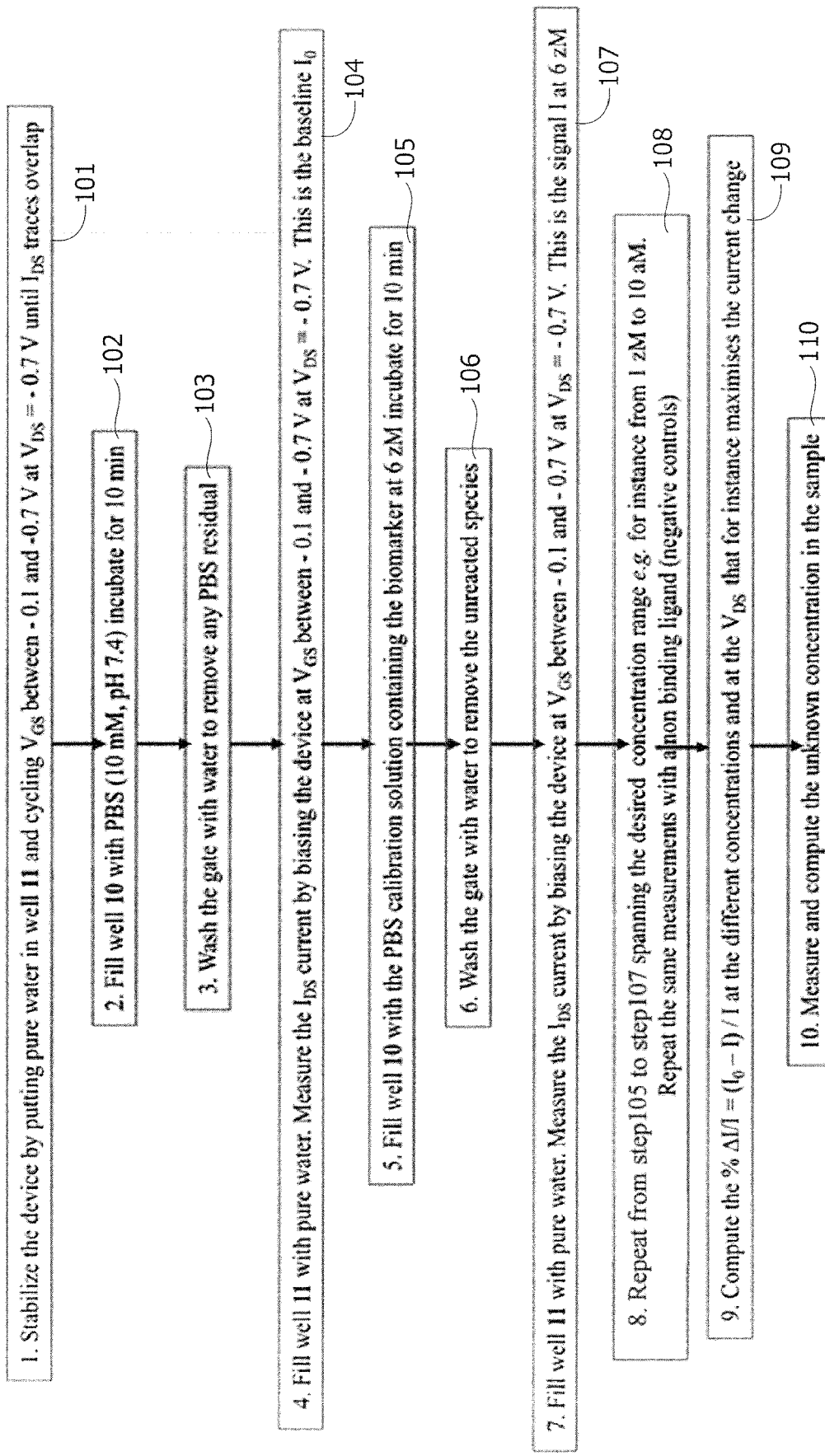
FIG. 6 is a flow chart showing an exemplary measurement procedure carried out by the biosensor according to the invention.

More specifically, the sensing measurements are carried out according to the protocol reported in FIG. 6 by measuring the transfer characteristics or more generally the source—drain current ($I_{DS}$) upon application of a constant source-drain bias $V_{DS}$.

The measurement method first envisages to stabilize the biosensor BS by putting HPLC-grade water in the well 11 and cycling the gate-source voltage $V_GS$ between −0.1 and −0.7 V with the drain-source voltage $V_{DS}$ set at −0.7 V until the drain current (channel current) $I_{DS}$ traces overlap (step 101). The FET is operated in the common source mode, for more details see (L. Torsi et al Chem. Soc. Rev., 2013,42, 8612-8628). This is carried out using the $G_G$ gate and cycling the gate potential in the elicited range until a stable source-drain ($I_{DS}$) current is measured. The $V_G$ potential range in which the transistor is cycled, setting $V_{DS}$ at a constant value generally between −0.4 and −0.7 V, is settled as wide as possible but at the same time making sure to minimizing the flowing of gate leakage currents ($I_G$s) associate generally with electrochemical processes occurring at the gate electrode.

Next, step 102, it is envisaged to fill the well 10 with a buffer solution, preferably a phosphate buffered saline (PBS) solution. In this case a bio-functionalized gate is used for instance the gate G1. In a specific tested example, the PBS solution is a 10 mM solution with a 7.4 pH. In the same tested example, this step is performed over an incubation time of 10 minutes.

The gate electrode plate 6 (G1) is then washed thoroughly with HPLC-grade water (step 103) to remove any PBS residue.

After that, step 104, the well 11 is filled with pure water (or PBS for the electrochemical PEDOT-PSS transistor) and the drain current (channel current) $I_{DS}$ is measured by biasing the biosensor BS with a gate-source voltage $V_GS$ between −0.1 and −0.7 V with the drain-source voltage $V_{DS}$ set at −0.7 V. The measured drain current is the baseline $I_0$. Well 11 is emptied afterwards.

In step 105 the well 10 is filled with a PBS calibration solution containing the biomarker (ligand) at 1-6 zM ($1\text{-}6\cdot 10^{-21}$) concentration, and the same is incubated for ten (10) minutes.

Then, step 106, the gate electrode plate 6 (G1) is washed with water to remove the unreacted species.

Next, at step 107, the well 11 is filled with pure water (or PBS for the electrochemical transistor) and the drain current (channel current) $I_{DS}$ is measured once again by biasing the biosensor BS with a gate-source voltage $V_GS$ between −0.1 and −0.7 V with the drain-source voltage $V_{DS}$ set at −0.7 V. The measured $I_{DS}$ current is the signal at 1-6 zM. Well 11 is emptied afterwards.

Step 108 further envisages to repeat steps 105 to 107 by sweeping through all the range going from, for instance, 1 zM to 10 nM. Generally, one measurement is taken every 10-fold increase in concentration. If necessary, any 2-9 fold increase step in concentrations can be used. The measurements are always carried out from the most diluted to the most concentrated solution.

Following this, the same measurement set is repeated on G2 using a real sample such saliva that is diluted n-times 1:10 (or even 1:2; 1:3 or 1:5) to obtain a sufficiently dense number of points in the range inspected. The exposition of the gate to the most diluted samples must report a zero response. If this is not the case a further dilution is required. Meaning that there is no significant current change, at the same gate and source bias, compared to $I_0$.

The set of experiments is repeated on gate G3 either as a replicate of the standard dose curve (G1) or as assay of the real sample (G2). G3 can also be used to perform a negative control experiment.

Before and after the measurements carried out on G2 and G3 in the inspected concentration range, the current level delivered by the transistor is assessed by using $G_G$ as gate. This is done by filling well 11 with water and measuring the transfer characteristic in the usual range. As already stated, this allows to quantitatively compare the signal measured on the different gates. Moreover, if the relative variation of the current levels measured on the on $G_G$ before and after the dose curve is too high (preferably when larger than 3-5% but depending on the amplitude of the sensing response also larger than 10-20%) and in the same direction of the sensing response, the sensing dose curve is discarded.

At step 109, when all of the data are collected, the relative percent source-drain current ($I_{DS}$) variation ($\Delta I/I$) % is measured, which is defined as $$(\Delta I/I)\% = (I_0 - I)/I$$

At each of the different biomarker concentrations and at the gate-source voltage $V_{GS}$ that maximizes the relative drain current change. This is performed for the data measured on each of the G1, G2 and G3 gate.

Last, step 110, the unknown concentration in the sample is computed. To this end the dose curve measured on gate G1 is modelled using the proprietary model reported in the European Patent Application 16207596.4 filed on Dec. 30, 2016 in the name of the same Applicant.

This model is used to derive and interpolating curve that is used to quantify the data resulting from the measurements of the real fluid at different dilution. Namely, from a comparison at each dilution a concentration is associated enabling a quantification of the biomarker in the real sample.

Given that the method enables to quantify very few particles of bio-markers detection at extremely low concentration is possible. In the European Patent Application 16207596.4 filed on Dec. 30, 2016 in the name of the same Applicant it was shown that a large portion of a gate constituted of a fully continuous layer of specific-binding-pair-forming substances a large portion of the gate are was responding in the presence of very few ligands. In a sense the whole gate surface become "blind" after the interaction with few bio-markers.

In the present case, thanks to the presence of the decoupled 9D domains that are generated on the gate during the sensing measurement, two contiguous domains 9D are mechanically and electrostatically decoupled by the presence of the rigid polymer barrier, so that a chemical or bio-chemical change occurring in one domain, due to a ligand recognition event, remains confined within the 9D small domain so as to impede the transmission of a conformational change or a phase transition (owing to the recognition event) from one domain to the other. Particularly, the patterned structure of the gate 6 according to the invention is intended to provide a response when at least one ligand impacts on one domains 9D. The rationale relies on the fact that the amplification of one single event will involve at most one domains 9D. So that the switching of the whole surface of a given patterned gate will take place across a number of concentrations orders of magnate that depends on the number of generated decoupled domains.

This is a key aspect in early detection of biomarkers (for instance for early diagnostics applications): the interaction that involves one ligand and one receptor—such as that occurring at the very early stages of development of a disease wherein the biomarker which is representative of the rising pathological condition is expected to have an extremely low concentration in the human body—cannot originate a signal that is detectable. In this latter regard, amplification allows detecting otherwise undetectable events.

In biological cells this is achieved by different processes that are not completely understood yet, but that are known to require a very large number of recognition elements. The biosensor BS essentially operates as a biological cell that is capable of sensing a single photon or tracking a single or few chemoattractants and at the same time is able to span a concentration range of at least three orders of magnitude.

The prerequisite for these events to occur mostly concerns the way the cell receptors are confined on the surface. In cells such as XX YY, they are characterized in fact by:
- being packed on a surface at an extremely high density
- exhibiting a high affinity for the ligand (biomarker) to be detected;
- responding to a wide dynamic range of ligand concentrations (up to 3 orders of magnitude).

Similarly, when one or few photons impact on the retina, millions of rods cells photo-detectors, that are highly packed too, can respond.

Such a system of highly packed receptors that form also stable complex with their affinity ligands allows to maximize the cross section of the interaction process between the photon and a photodetector as well as between the receptor and its affinity ligand.

In the biosensor BS, in each domain 9D the close proximity due to the highly packed biological recognition elements allows the perturbation induced by the formation of the first ligand-receptor complex to spread to the neighbouring receptors as in a domino effect—same as in biological cells. The remainder of the domains 9D are—however—still ready to transduce ligand recognition events until all of them are inactivated by the respective recognition events.

This is a technical advantage of the invention over the available prior art: in the gate electrode 6 of the biosensor BS according to the invention, the "blinding" or de-activation effect involves at most the domain wherein the recognition event occurs (or at the very most the neighbouring domains, as said), while the other domains remain fully active as far as biological recognition of ligands is concerned, thereby allowing further detections (even with difference in ligand concentration ranging up to plural orders of magnitude) until all of the domain get involved in ligand recognition event and return a corresponding signal.

The domains 9D areas are meant to segregate the patch-forming process (i.e. the conformational change spreading patchwise following a recognition event) to a given portion of the electrode so that the biosensor BS is capable of sensing both single ligand recognition events but also ligand concentrations at least three orders of magnitude larger. The larger the number of domains 9D, the larger the concentration dynamic range is. The maximum number of patches will be limited by the signal to noise ratio to be at least 10 times the standard deviation of the black (base line, or current in the presence of no analyte).

The density of the biological recognition elements on the functionalized gate electrode 6 may be further enhanced by adding a protein such as Bovine Serum Albumin (BSA) that fills the possible voids between the chemically grafted biological recognition elements that form the SAM layer 9. This will also act also to minimize nonspecific binding. An example of a preferred functionalization method involving the use of BSA is disclosed in the co-pending European Patent Application 16207596.4 filed on Dec. 30, 2016 in the name of the same Applicant.

Of course, the details of construction and the embodiments may vary widely with respect to what has been described and illustrated herein, without thereby departing from the sphere of protection of the present invention, as defined by the annexed claims.

The invention claimed is:
1. A field effect transistor sensor including:
   a substrate;
   a source electrode;
   a drain electrode;
   a gate electrode functionalized with a layer of biological recognition elements;
   a source-drain channel;
   a semiconductor layer; and
   the layer of biological recognition elements patterned into a plurality of uncoupled domains, such that a surface of the gate electrode is divided into areas of said biological recognition elements;
wherein each domain of said plurality of domains are chemically decoupled from each other domain of said plurality of domains, whereby a chemical change in a first domain of said plurality of domains due to a ligand recognition event is confined within said first domain;
wherein the plurality of domains are arranged according to a matrix; and
wherein each domain of said plurality of domains has a surface extension ranging from $10^{-7}$-$10^{-4}$ cm$^2$ to $10^{-5}$-$10^{-1}$ cm$^2$.

2. The field effect transistor sensor of claim 1, wherein the semiconductor layer is covered with an ionic-conducting material.

3. The field effect transistor sensor of claim 2, wherein the ionic-conducting material is an ionic-conducting-electron-insulating material.

4. The field effect transistor sensor of claim 3, wherein the ionic-conducting-electron-insulating material includes one of the following:
   an ionic-conducting-electron-insulating liquid;
   an ionic-conducting-electron-insulating gel;
   an ionic-conducting-electron-insulating solid; and
   HPLC grade water.

5. The field effect transistor sensor of claim 2, wherein the ionic-conducting material includes one of the following:
   an ionic liquid; and
   an ionic conducting polyelectrolyte polymer.

6. The field effect transistor sensor according to claim 2, wherein the ionic-conducting material is hydrophobic.

7. The field effect transistor sensor according to claim 2, wherein the ionic-conducting material is hydrophilic.

8. The field effect transistor sensor according to claim 1, wherein the layer of biological recognition elements is a self assembled monolayer (SAM) of biological recognition elements.

9. The field effect transistor sensor according to claim 8, wherein the self assembled monolayer (SAM) of biological recognition elements is further functionalized with Bovine Serum Albumin (BSA).

10. The field effect transistor sensor according to claim 1, further including a first well enclosing said gate electrode and said layer of biological recognition elements.

11. The field effect transistor sensor according to claim 10, further including a second well enclosing each first well, said source-drain channel and said semiconductor layer.

* * * * *